(12) United States Patent
Heo et al.

(10) Patent No.: US 10,623,885 B2
(45) Date of Patent: Apr. 14, 2020

(54) WATCH TYPE MOBILE TERMINAL AND OPERATION METHOD THEREOF

(71) Applicant: LG ELECTRONICS INC., Seoul (KR)

(72) Inventors: Jeongyun Heo, Seoul (KR); Hyungtae Jang, Seoul (KR); Wonseok Joung, Seoul (KR); Jaewoo Jeong, Seoul (KR); Junghoon Chu, Seoul (KR); Minkyoung Shin, Seoul (KR); Jinhae Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/739,869

(22) PCT Filed: Jul. 17, 2015

(86) PCT No.: PCT/KR2015/007476
§ 371 (c)(1),
(2) Date: Dec. 26, 2017

(87) PCT Pub. No.: WO2016/208802
PCT Pub. Date: Dec. 29, 2016

(65) Prior Publication Data
US 2018/0367944 A1    Dec. 20, 2018

(30) Foreign Application Priority Data
Jun. 25, 2015 (KR) .......................... 10-2015-0090795

(51) Int. Cl.
*H04W 4/02* (2018.01)
*H04W 88/02* (2009.01)
*H04W 12/00* (2009.01)
*H04W 12/06* (2009.01)
*G06F 1/16* (2006.01)
(Continued)

(52) U.S. Cl.
CPC .............. *H04W 4/02* (2013.01); *G06F 1/163* (2013.01); *H04W 12/003* (2019.01); *H04W 12/04* (2013.01); *H04W 12/06* (2013.01); *H04W 88/02* (2013.01); *H04W 4/029* (2018.02); *H04W 4/06* (2013.01); *H04W 4/80* (2018.02)

(58) Field of Classification Search
CPC ....... H04W 4/02; H04W 88/02; H04W 12/04; H04W 12/06; G06F 1/163
USPC ......................................................... 455/41.2
See application file for complete search history.

(56) References Cited

U.S. PATENT DOCUMENTS

2009/0326406 A1    12/2009    Tan et al.
2011/0053558 A1*    3/2011    Teague .................. H04L 9/3273
455/411

(Continued)

*Primary Examiner* — Ayodeji O Ayotunde
(74) *Attorney, Agent, or Firm* — Birch, Stewart, Kolasch & Birch, LLP

(57) ABSTRACT

A watch-type mobile terminal includes a short-range communication module configured to perform short-range communication with a mobile terminal around the watch-type mobile terminal, an output unit configured to output a sound pattern or a vibration pattern, and a control unit configured to control the output unit to output a connection pattern for pairing with the mobile terminal and control the short-range communication module to perform pairing with the mobile terminal based on the output connection pattern, wherein the connection pattern is any one of a sound pattern and a vibration pattern.

16 Claims, 28 Drawing Sheets

Type1

Type2

(51) Int. Cl.
  *H04W 12/04*   (2009.01)
  *H04W 4/80*   (2018.01)
  *H04W 4/06*   (2009.01)
  *H04W 4/029*   (2018.01)

(56) References Cited

U.S. PATENT DOCUMENTS

| | | |
|---|---|---|
| 2011/0217950 A1 | 9/2011 | Kozlay |
| 2014/0128031 A1 | 5/2014 | Park et al. |
| 2014/0139422 A1* | 5/2014 | Mistry ................... G06F 3/014 |
| | | 345/156 |
| 2014/0206289 A1* | 7/2014 | Rahman ................. H04W 4/80 |
| | | 455/41.2 |
| 2014/0256260 A1* | 9/2014 | Ueda ................... H04L 63/0492 |
| | | 455/41.2 |
| 2015/0050879 A1* | 2/2015 | MacDuff ............... H04W 12/06 |
| | | 455/39 |
| 2016/0309286 A1* | 10/2016 | Son ..................... H04L 63/0861 |

\* cited by examiner

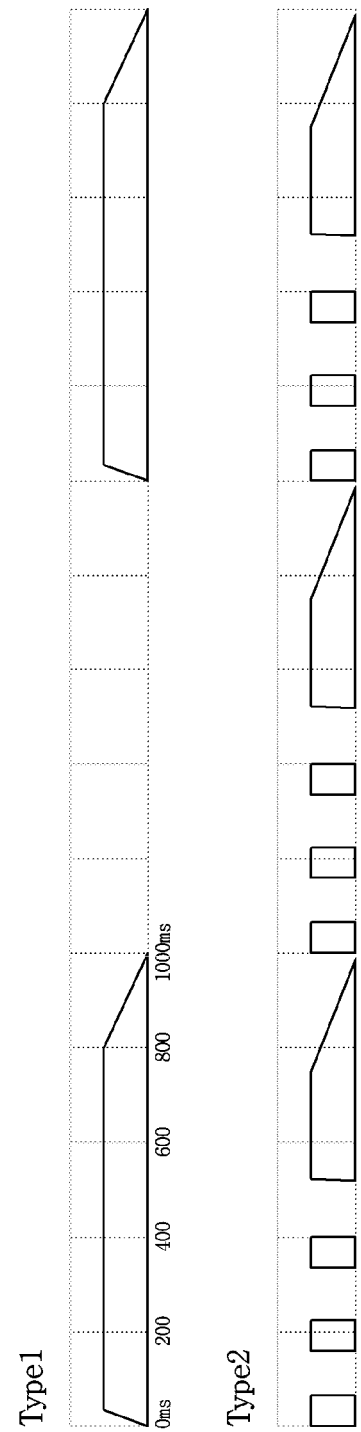

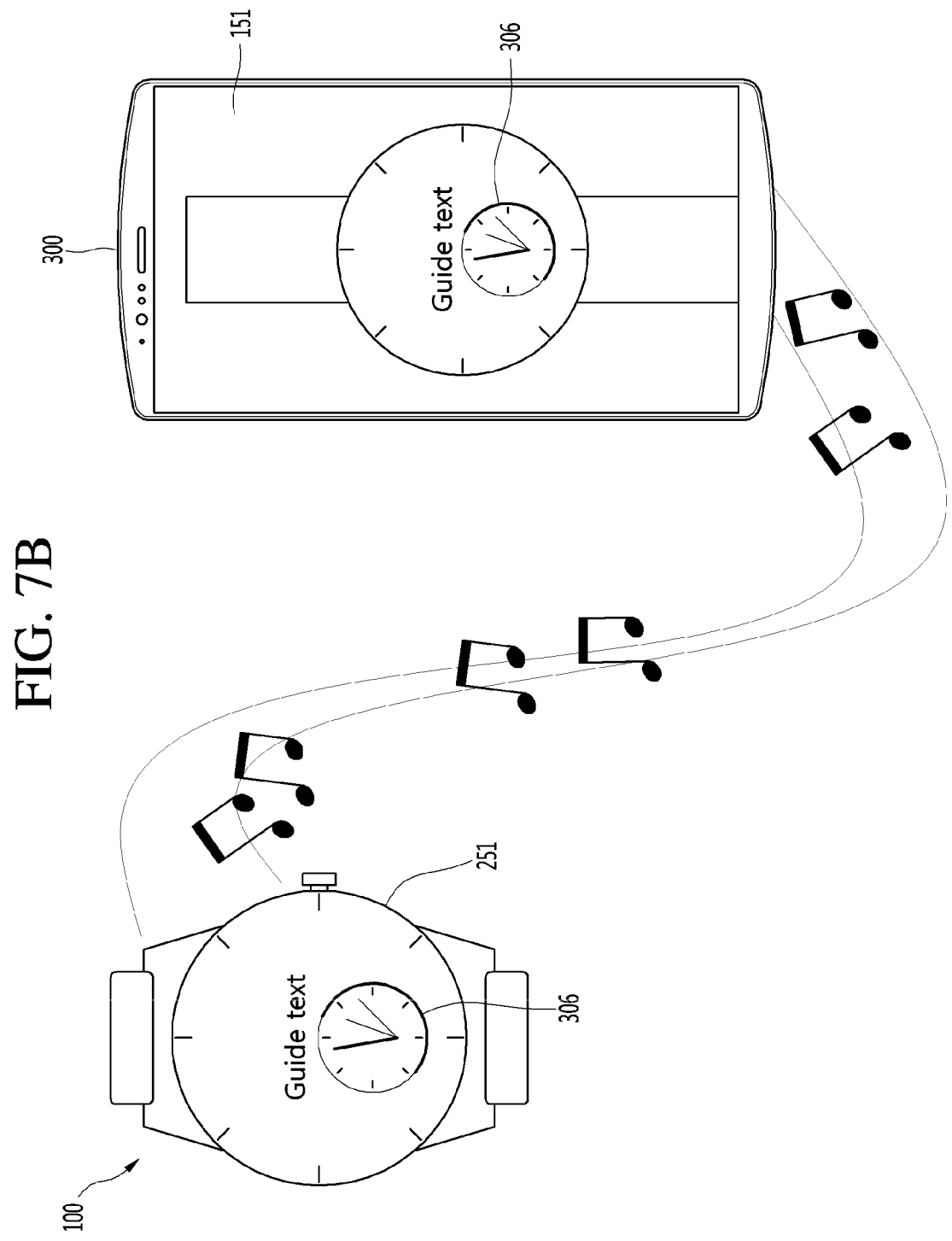

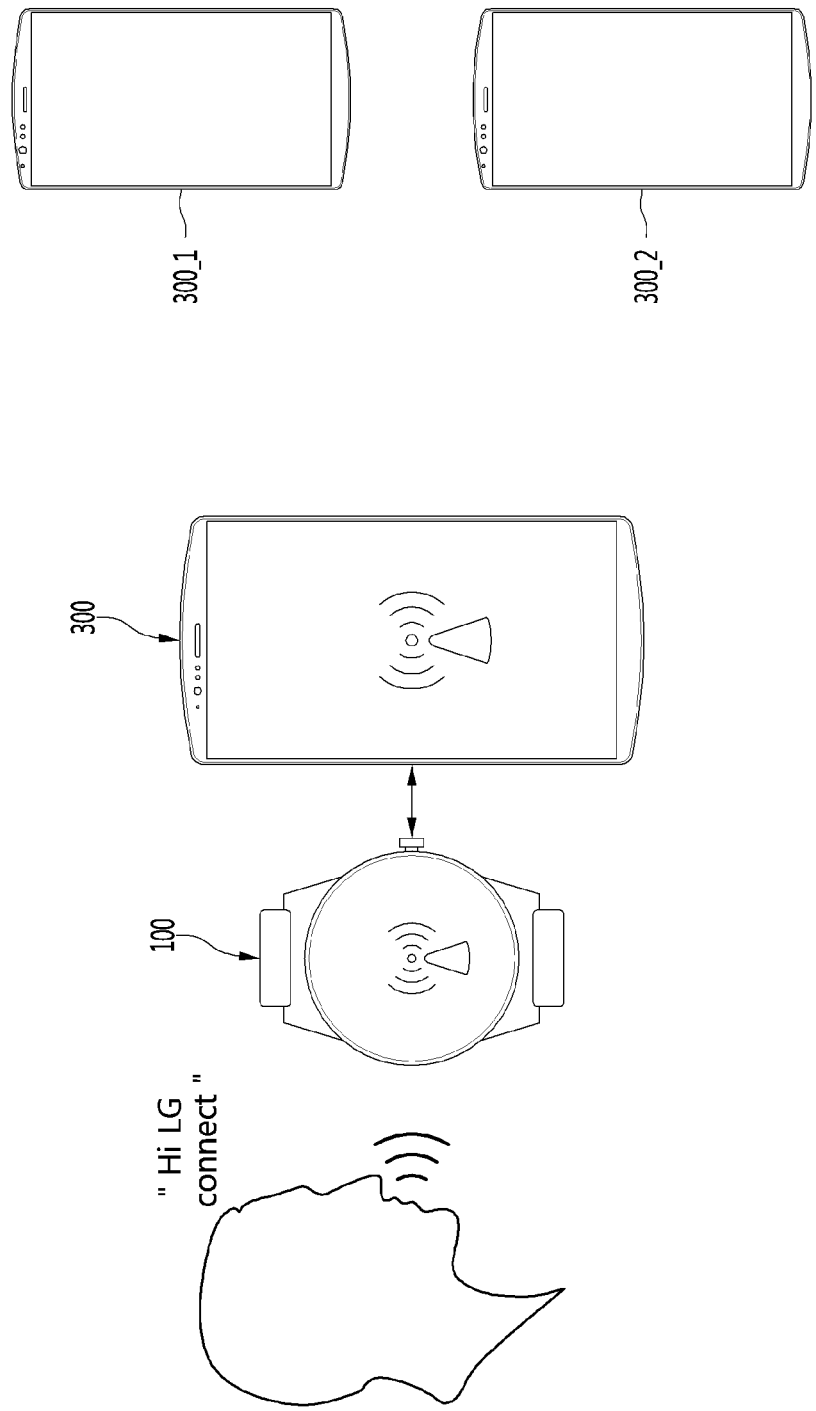

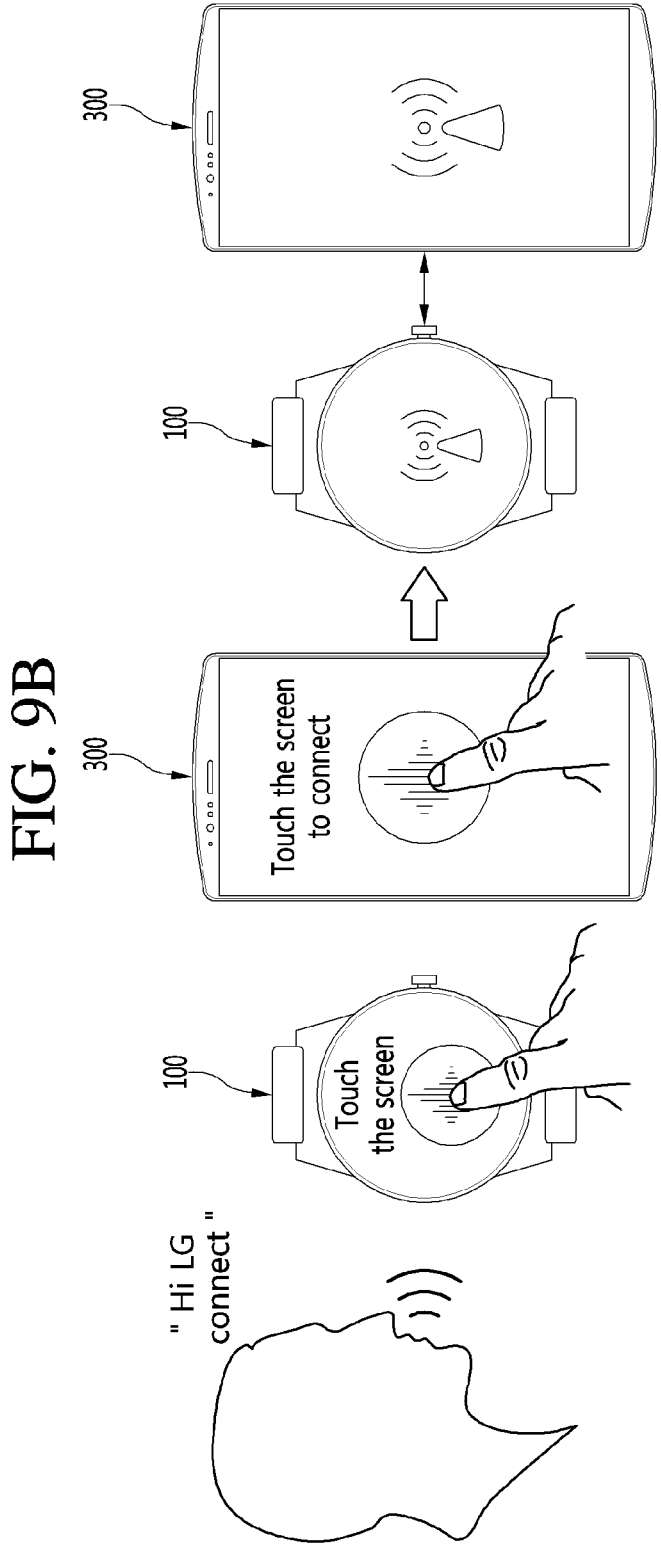

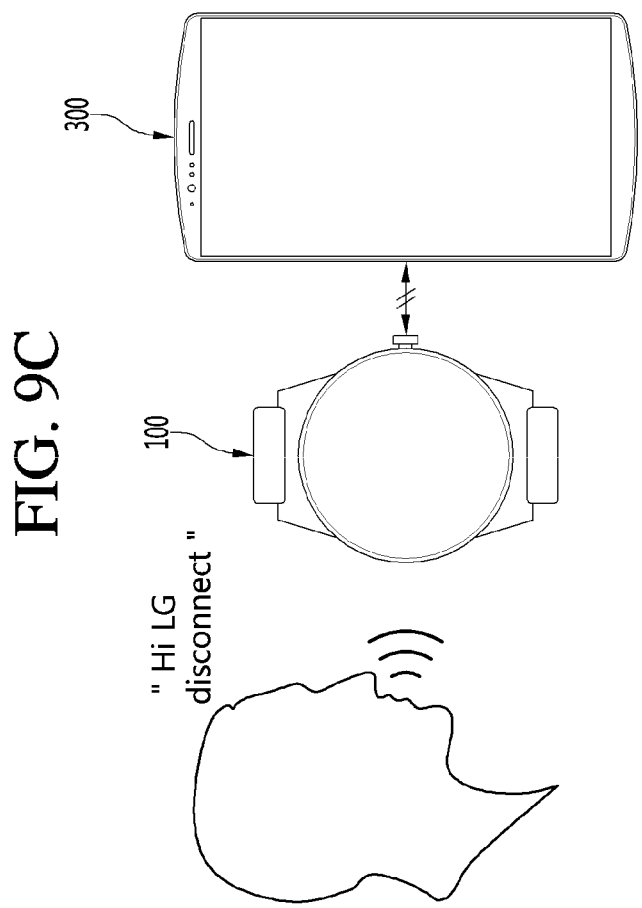

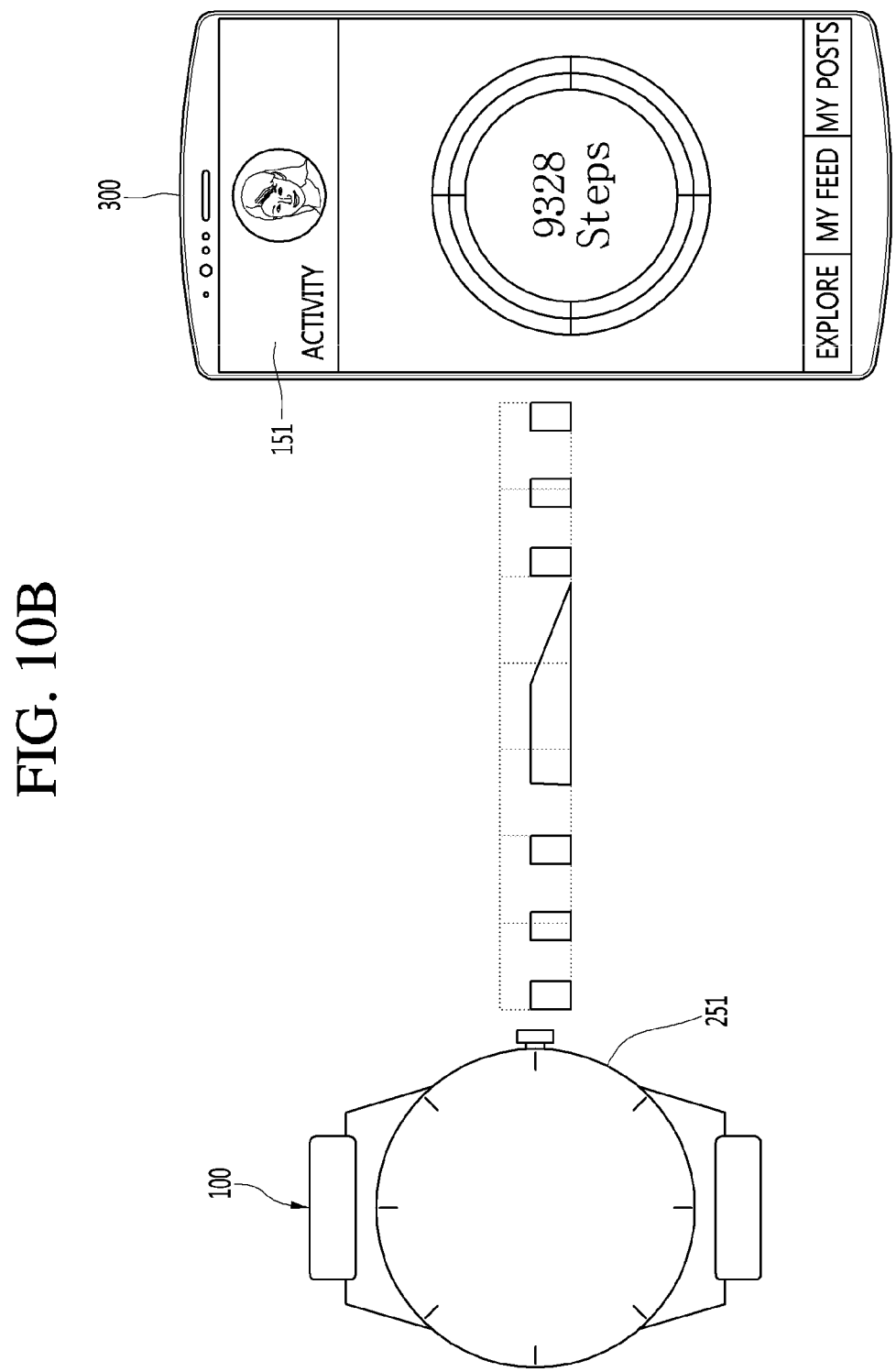

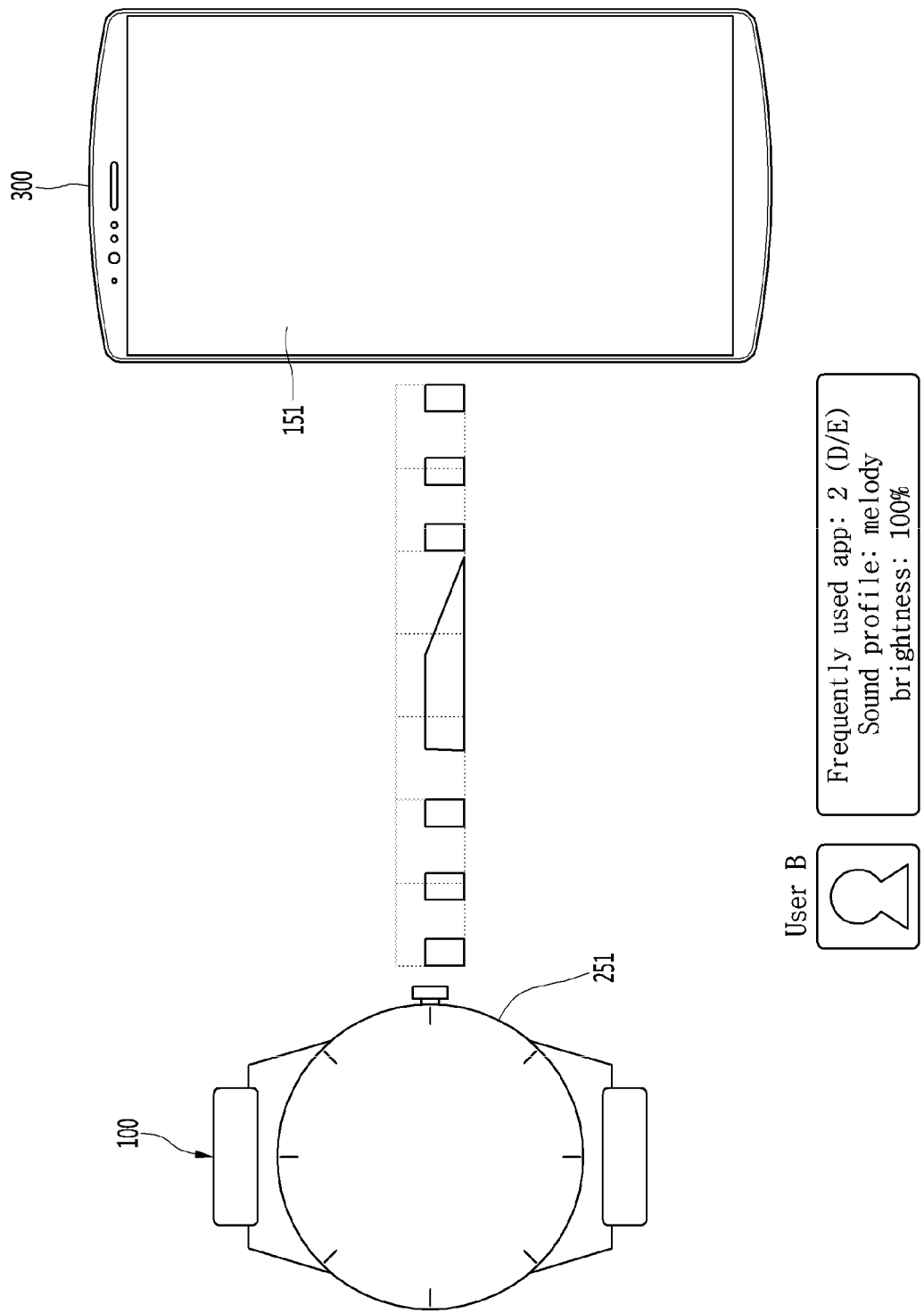

WATCH TYPE MOBILE TERMINAL AND OPERATION METHOD THEREOF

CROSS REFERENCE TO RELATED APPLICATIONS

This application is the National Phase of PCT International Application No. PCT/KR2015/007476, filed on Jul. 17, 2015, which claims priority under 35 U.S.C. 119(a) to Patent Application No. 10-2015-0090795, filed in Republic of Korea on Jun. 25, 2015, all of which are hereby expressly incorporated by reference into the present application.

TECHNICAL FIELD

The present invention relates to a watch-type mobile terminal, the use of which is capable of being implemented in more consideration of user convenience.

BACKGROUND ART

Terminals may be classified into mobile/portable terminals and stationary terminals depending on the mobility. The mobile terminals may be classified into handheld terminals and vehicle mount terminals according to direct portability by a user.

Functions of the mobile terminals become diversified. The functions of the mobile terminals include data and voice communication, picture capturing and video recording through a camera, voice recording, a music file playback through a speaker system, and image or video output to a display unit. Some terminals further include an electronic game play function or perform a multimedia player function. In particular, recent mobile terminals may receive multicast signals providing visual content such as broadcasts and video or television programs.

The mobile terminals are mostly held in the hands and are used by a user, and furthermore, may be expanded to wearable devices which may be worn on the body of the user. Examples of such a wearable device include a watch-type mobile terminal, a glass-type mobile terminal, a head mounted display (HMD), and the like.

Among the mobile terminals, the watch-type mobile terminal is a mobile terminal in which an electronic function, a communication function, a multimedia function, and the like are added to a watch always worn by people. Since the watch-type mobile terminal does not cause negative feeling to people, it appears that the market for the watch-type mobile terminal is explosively created in the future.

Therefore, a research, a development, and commercialization of the watch-type mobile terminal are actively conducted.

DISCLOSURE OF THE INVENTION

Technical Problem

Embodiments of the present invention are directed to provide a watch-type mobile terminal capable of being easily paired with a mobile terminal therearound through a connection pattern such as a sound pattern or a vibration pattern.

Technical Solution

In one embodiment, a watch-type mobile terminal includes: a short-range communication module configured to perform short-range communication with a mobile terminal around the watch-type mobile terminal; an output unit configured to output a sound pattern or a vibration pattern; and a control unit configured to control the output unit to output a connection pattern for pairing with the mobile terminal and control the short-range communication module to perform pairing with the mobile terminal based on the output connection pattern, wherein the connection pattern is any one of a sound pattern and a vibration pattern.

In another embodiment, an operation method of a watch-type mobile terminal includes: outputting a connection pattern for pairing with a mobile terminal around the watch-type mobile terminal; and performing pairing with the mobile terminal based on the output connection pattern, wherein the connection pattern is any one of a sound pattern and a vibration pattern.

A pairing request code for authenticating the pairing may be inserted into the sound pattern.

The pairing request code may include a plurality of unit codes each inserted into each of a plurality of sound signal sections constituting the sound pattern.

The watch-type mobile terminal may further include a display unit, wherein, while the control unit outputs the connection pattern, the control unit controls the display unit to display a process of the pairing.

When the watch-type mobile terminal is paired with the mobile terminal through the sound pattern, the control unit may execute a first application corresponding to the sound pattern.

When the watch-type mobile terminal is paired with the mobile terminal through the vibration pattern, the control unit may execute a second application corresponding to the vibration pattern.

The control unit may automatically change at least one of sound setting and alarm setting of the watch-type mobile terminal according to a kind of the connection pattern.

The control unit may convert an operation mode of the watch-type mobile terminal into a user mode corresponding to a specific user according to a kind of the connection pattern.

In further another embodiment, a mobile terminal includes: a short-range communication module configured to perform short-range communication with a watch-type mobile terminal around the mobile terminal; an input unit configured to acquire a sound pattern or a vibration pattern output from the watch-type mobile terminal; and a control unit configured to control the short-range communication module to perform pairing with the watch-type mobile terminal when the sound pattern or the vibration pattern acquired by the input unit is a preset pattern.

Advantageous Effects

According to embodiments of the present invention, it is possible to perform pairing with a surrounding mobile terminal through a connection pattern such as a sound pattern or a vibration pattern without additional input of a user.

BRIEF DESCRIPTION OF THE DRAWINGS

FIG. 5 is a diagram illustrating a vibration pattern recognizable as a pairing request signal, according to another embodiment of the present invention.

FIGS. 7A to 7D are diagrams illustrating a process in which a mobile terminal acquires a sound pattern output from a watch-type mobile terminal to perform pairing, according to an embodiment of the present invention.

FIGS. 9A to 9C are diagrams illustrating a process in which a watch-type mobile terminal 100 and a mobile terminal 300 perform pairing through a voice command of a user, according to an embodiment of the present invention.

FIGS. 10A and 10B are diagrams illustrating an example in which applications corresponding to kinds of connection patterns are executed on paired devices, according to various embodiments of the present invention.

FIGS. 13A and 13B are diagrams illustrating an example in which each of a watch-type mobile terminal and a mobile terminal enters a specific user mode according to a connection pattern between the watch-type mobile terminal and the mobile terminal.

MODE FOR CARRYING OUT THE INVENTION

Figure 1:
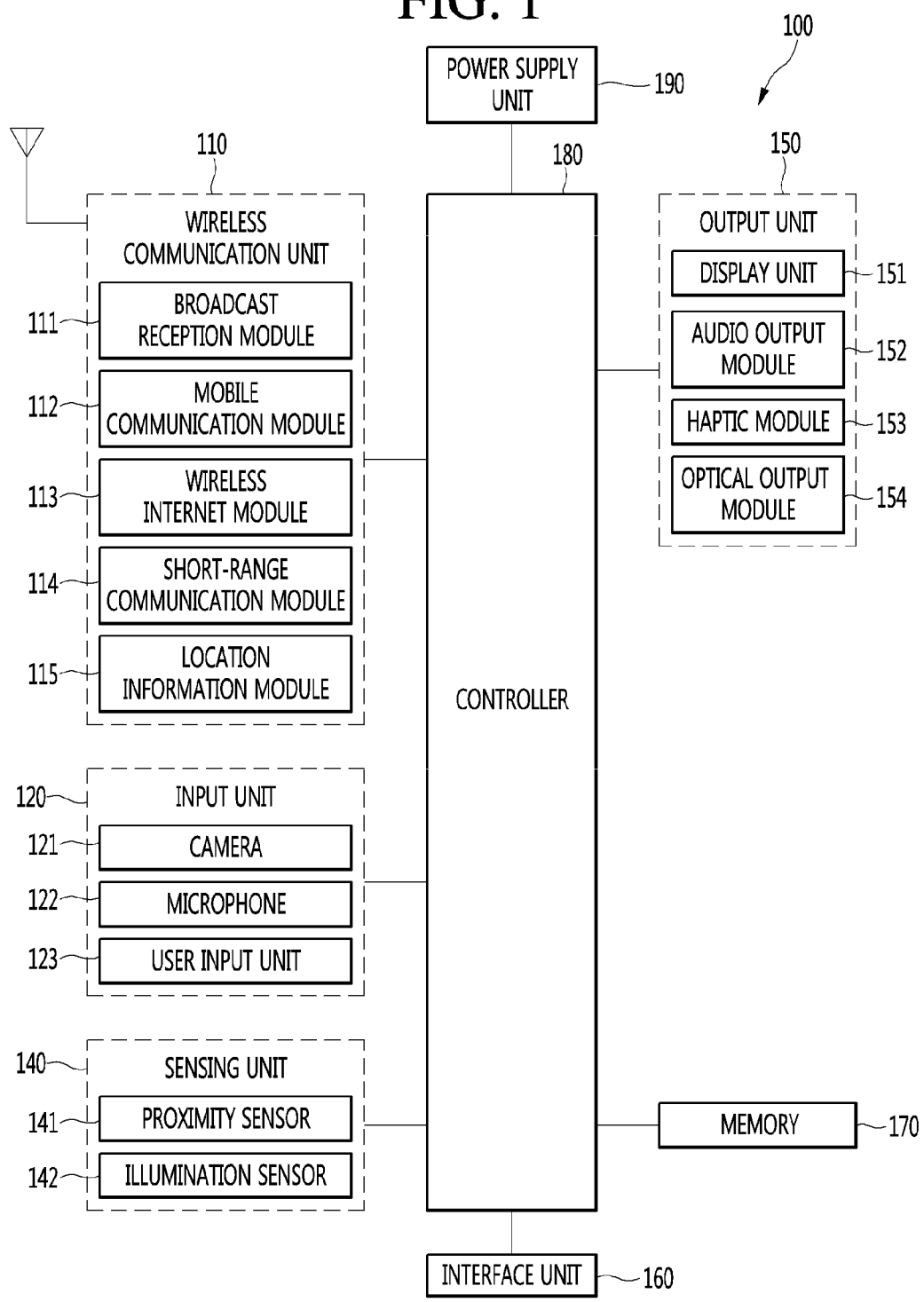
FIG. 1 is a block diagram for explaining a mobile terminal related to the present invention.

Hereinafter, embodiments are described in more detail with reference to accompanying drawings and regardless of the drawings symbols, same or similar components are assigned with the same reference numerals and thus repetitive for those are omitted. Since the suffixes "module" and "unit" for components used in the following description are given and interchanged for easiness in making the present disclosure, they do not have distinct meanings or functions. In the following description, detailed descriptions of well-known functions or constructions will be omitted because they would obscure the present invention in unnecessary detail. Also, the accompanying drawings are used to help easily understanding embodiments disclosed herein but the technical idea of the present invention is not limited thereto. It should be understood that all of variations, equivalents or substitutes contained in the concept and technical scope of the present invention are also included.

FIG. 1 is a block diagram for explaining a mobile terminal related to an embodiment.

A watch-type mobile terminal 100 may include a wireless communication unit 110, an input unit 120, a sensing unit 140, an output unit 150, an interface unit 160, a memory 170, a control unit 180, and a power supply unit 190. In implementing the watch-type mobile terminal, components shown in FIG. 1 are not necessary, so the watch-type mobile terminal described in this specification may include more or less components than those listed above.

In more detail, the wireless communication unit 110 typically includes one or more modules which permit communications such as wireless communications between the watch-type mobile terminal 100 and a wireless communication system, communications between the watch-type mobile terminal 100 and another mobile terminal, communications between the watch-type mobile terminal 100 and an external server. Further, the wireless communication unit 110 typically includes one or more modules which connect the watch-type mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 may include one or more sensors to sense at least one of internal information of the watch-type mobile terminal, surrounding environment information of the watch-type mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The watch-type mobile terminal 100 may be configured to utilize the combination of information sensed of at least two of the sensors.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the watch-type mobile terminal 100 and a user, as well as function as the user input unit 123 which provides an input interface between the watch-type mobile terminal 100 and the user.

The interface unit 160 serves as an interface with various types of external devices that may be coupled to the watch-type mobile terminal 100. The interface unit 160, for example, may include any of wired or wireless ports, external charging ports, wired or wireless data ports, memory card ports, ports for connecting a device having an identification module, audio input/output (I/O) ports, video I/O ports, earphone ports, and the like. In some cases, the watch-type mobile terminal 100 may perform assorted control functions associated with a connected external device, in response to the external device being connected to the interface unit 160.

The memory 170 is typically implemented to store data to support various functions or features of the watch-type mobile terminal 100. For instance, the memory 170 may be configured to store application programs executed in the watch-type mobile terminal 100, data or instructions for operations of the watch-type mobile terminal 100, and the like. Some of these application programs may be downloaded from an external server via wireless communication. Other application programs may be installed within the watch-type mobile terminal 100 at time of manufacturing or shipping, which is typically the case for basic functions of the watch-type mobile terminal 100 (for example, receiving a call, placing a call, receiving a message, sending a message, and the like). It is common for application programs to be stored in the memory 170, installed in the watch-type mobile terminal 100, and executed by the control unit 180 to perform an operation (or function) for the watch-type mobile terminal 100.

The control unit 180 typically functions to control overall operation of the watch-type mobile terminal 100, in addition to the operations associated with the application programs. The control unit 180 may provide or process information or functions appropriate for a user by processing signals, data, information and the like, which are input or output by the various components as described above, or activating application programs stored in the memory 170.

The control unit 180 may provide or process information or functions appropriate for a user by processing signals, data, information and the like, which are input or output by the various components depicted in FIG. 1, or activating application programs stored in the memory 170. Further, the control unit 180 operates at least two of components included in the watch-type mobile terminal 100 by combining the at least two of components.

The power supply unit 190 may be configured to receive external power or provide internal power in order to supply appropriate power required for operating elements and components included in the watch-type mobile terminal 100, under the control of the control unit 180. The power supply unit 190 may include a battery, and the battery may be configured to be embedded in the terminal body, or configured to be detachable from the terminal body.

At least some of the components may operate in cooperation with each other to realize the operation, the control, or the control method of a watch-type mobile terminal according to various embodiments to be described below. In addition, the operation, the control, or the control method of a watch-type mobile terminal may be realized on the watch-type mobile terminal by running at least one application program stored in the memory 170.

Before the description of various embodiments realized through the watch-type mobile terminal 100 described above, the above components will be described in more detail with reference to FIG. 1.

Regarding the wireless communication unit 110, the broadcast receiving module 111 of the wireless communication unit is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be provided in the watch-type mobile terminal 100 for simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

Examples of wireless signals include voice call signals, video (telephony) call signals, or various formats of data to support communication of text and multimedia messages.

The wireless Internet module 113, which refers to a module to access the wireless Internet, may be embedded in the mobile terminal 100 or provided outside the mobile terminal 100. The wireless Internet module 113 may transmit and/or receive wireless signals via communication networks according to wireless Internet technologies Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless Internet module 113 may cooperate with, or function as, the mobile communication module 112.

The short-range communication module 114 is configured to facilitate short-range communications. Suitable technologies for implementing such short-range communications include Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the watch-type mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The short-range communication module 114 may sense or recognize the wearable device, and permit communication between the wearable device and the watch-type mobile terminal 100. In addition, when the sensed wearable device is a device which is authenticated to communicate with the watch-type mobile terminal 100, the control unit 180, for example, may cause transmission of data processed in the watch-type mobile terminal 100 to the wearable device via the short-range communication module 114. Hence, a user of the wearable device may use the data processed in the watch-type mobile terminal 100 on the wearable device. For example, when a call is received in the watch-type mobile terminal 100, the user may answer the call using the wearable device. Also, when a message is received in the watch-type mobile terminal 100, the user may check the received message using the wearable device.

The location information module 115 is a module to acquire a location of the mobile terminal. As an example, the location information module 115 representatively includes a Global Position System (GPS) module, a Wi-Fi module, or both. For example, if the mobile terminal utilizes the GPS module, the position of the mobile terminal may be acquired by using the signal sent from the GPS satellite. Alternatively, if the mobile terminal utilizes the Wi-Fi module, the position of the mobile terminal may be acquired based on the information of a wireless access point (AP) for transmitting or receiving a wireless signal together with the Wi-Fi module. If necessary, the Location information module 115 may any one of functions of other modules of the wireless communication unit 110 to alternatively or additionally acquire the location data of the mobile terminal. The location information module 115, which is a module used to acquire the location (or current location) of the mobile terminal, is not limited to a module to directly calculate or acquire the position of the mobile terminal.

The input unit 120 may be configured to permit various types of input to the mobile terminal. Examples of such input include audio, image, video, data, and user input. In order to obtain the input of video information, the watch-type mobile terminal 100 may include one or more cameras 121. Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the watch-type mobile terminal 100. As another example, the cameras 121 may be located in a stereoscopic arrangement to acquire left and right images for implementing a stereoscopic image.

The microphone 122 converts external sound signal into electrical voice signal. The processed voice data may be utilized variously depending on functions (or application under running) executed by the watch-type mobile terminal 100. If desired, the microphone 122 may include assorted noise removing algorithms to remove unwanted noise generated in the course of receiving the external sound.

The user input unit 123 is a component that permits input by a user. Such user input may enable the control unit 180 to control operation of the watch-type mobile terminal 100. The user input unit 123 may include one or more of a mechanical input element (for example, a key, a button located on a front and/or rear surface or a side surface of the watch-type mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sensing unit 140 to control operation of the watch-type mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, the control unit 180 processes data (or information) corresponding to proximity touches and proximity touch patterns sensed by the proximity sensor 141, and cause output of visual information on the touch screen. In addition, the control unit 180 may control the watch-type mobile terminal 100 to execute different operations or process different data according to whether a touch with respect to a point on the touch screen is either a proximity touch or a contact touch.

A touch sensor may sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, a corresponding signal (signals) may be transmitted to a touch controller. The touch controller may process the received signal (signals), and then transmit corresponding data to the control unit 180. Accordingly, the control unit 180 may sense which region of the display unit 151 has been touched. Here, the touch controller may be a component separate from the control unit 180, the control unit 180, and combinations thereof.

Meanwhile, the control unit 180 may execute the same or different controls according to a type of touch object that touches the touch screen or a touch key provided in addition to the touch screen. Whether to execute the same or different control according to the object which provides a touch input may be decided based on a current operating state of the watch-type mobile terminal 100 or a currently executed application program, for example.

Meanwhile, the touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

An ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which is described as an element of the input unit 12, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the watch-type mobile terminal 100. For example, the display unit 151 may display execution screen information of an application program executing at the watch-type mobile terminal 100 or user interface (UI) and graphic user interface (GUI) information in response to the execution screen information.

The audio output module 152 is generally configured to output audio data received from the wireless communication unit 110 or stored in the memory 170 during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the watch-type mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

The haptic module 153 may generate, in addition to the vibration, various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that may absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the watch-type mobile terminal 100.

An optical output module 154 may output a signal for indicating an event generation using light of a light source. Examples of events generated in the watch-type mobile terminal 100 may include message reception, call signal reception, a missed call, an alarm, a schedule notice, an email reception, information reception through an application, and the like.

A signal output by the optical output module 154 may be implemented in such a manner that the watch-type mobile terminal emits monochromatic light or light with a plurality of colors to the front surface or rear surface thereof. The signal output may be terminated as the watch-type mobile terminal senses that a user has checked the generated event.

The interface unit 160 serves as an interface for external devices to be connected with the mobile terminal 100. For example, the interface unit 160 may receive data transmitted from an external device, receive power to transfer to elements and components within the watch-type mobile terminal 100, or transmit internal data of the watch-type mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various pieces of information for authenticating authority of using the watch-type mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

When the watch-type mobile terminal 100 is connected with an external cradle, the interface unit 160 may serve as a passage to allow power from the cradle to be supplied to the watch-type mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 may store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The watch-type mobile terminal 100 may also be operated in relation to a network storage device that performs the storage function of the memory 170 over a network, such as the Internet.

Meanwhile, as described above, the control unit 180 may typically control the general operations of the watch-type mobile terminal 100. For example, the control unit 180 may set or release a lock state for restricting a user from inputting a control command with respect to applications when a status of the mobile terminal meets a preset condition.

The control unit 180 may also perform the controlling and processing associated with voice calls, data communications, video calls, and the like, or perform pattern recognition processing to recognize a handwriting input or a picture drawing input performed on the touch screen as characters or images, respectively. In addition, the control unit 180 may control one or a combination of those components in order to implement various exemplary embodiments disclosed herein.

The power supply unit 190 receives external power or provides internal power and supply the appropriate power required for operating respective elements and components included in the watch-type mobile terminal 100 under the control of the control unit 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. According to the present embodiment, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

First, the communication system may use mutually different wireless interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including Orthogonal Frequency Division Multiplexing (OFDM) wireless communication as well as the CDMA wireless communication system.

A CDMA wireless communication system is shown having at least one terminal 100, at least one base station (BS) (which is named Node B or Evolved Node B), at least one of base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs may be included in the CDMA wireless communication system.

Each base station may include one or more sectors, each sector having an omni-directional antenna or an antenna pointed in a particular direction radially away from the BS. Alternatively, each sector may include two or more different antennas. Each BS may be configured to support a plurality of frequency assignments, with each frequency assignment having a particular spectrum (e.g., 1.25 MHz, 5 MHz, etc.).

The intersection of sector and frequency assignment may be referred to as a CDMA channel. The BS may also be referred to as Base Station Transceiver Subsystems (BTSs). In some cases, the term "base station" may be used to refer collectively to a BSC, and one or more BS. The base stations may also be denoted as "cell sites." Alternatively, individual sectors of a specific base station may be referred to as cell sites.

A broadcasting transmitter (BT) transmits a broadcast signal to the terminals 100 operating within the system. The broadcast receiving module 111 as illustrated in FIG. 1 is typically configured inside the watch-type mobile terminal 100 to receive broadcast signals transmitted by the BT.

In addition, Global Positioning System (GPS) satellites may be connected with the CDMA wireless communication to identify the position of the watch-type mobile terminal 100. Such satellites 300 facilitate locating the position of at least one of plural watch-type mobile terminal 100. It is understood that useful position information may be obtained with greater or fewer satellites than two satellites. The position of the watch-type mobile terminal 100 may be tracked by using all technologies that is able to tract the location as well as the GPS tracking technology. In addition, at least one of the GPS satellites may alternatively or additionally be configured to provide satellite DMB transmissions.

The location information module 115 included in the mobile terminal is used for detecting, computing, or identifying the position of the mobile terminal, and may representatively include a Global Position System (GPS) module and a WiFi (Wireless Fidelity) module. If necessary, the location information module 115 may alternatively or additionally perform any of the other functions of the wireless communication unit 110 to obtain data on the position of the mobile terminal.

The GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location. However, it is difficult to measure the position of the mobile terminal by using the GPS module in a shadow area, such as an interior, of a satellite signal. Accordingly, in order to compensate for the positioning based on the GPS scheme, a WiFi positioning system (WPS) may be utilized.

The WiFi Positioning System (WPS) is a technology of tracking the position of the mobile terminal 100 by using a WiFi module included in the mobile terminal 100 and a wireless access point (AP) which transceives a wireless signal together the WiFi module. The WPS denotes a wireless local area network (WLAN) using WiFi The WiFi positioning system may include a WiFi positioning server, the mobile terminal 100, a wireless AP connected with the mobile terminal 100, and a database having arbitrary wireless AP information stored therein.

The mobile terminal 100 in connection with the wireless AP may transmit a location information request message to the WiFi positioning system.

A WiFi positioning server extracts information of a wireless AP connected with the mobile terminal 100 based on a location information request message (or signal) of the mobile terminal 100. The information of the wireless AP connected with the mobile terminal 100 may be transmitted to the Wi-Fi positioning server through the mobile terminal 100 or may be transmitted from the wireless AP to the Wi-Fi location server.

The information of the wireless AP to be extracted based on the location information request message of the mobile terminal 100 includes a MAC address, an SSID (Service Set Identification), a Received Signal Strength Indicator (RSSI), a Reference Signal Received Power (RSRP), Reference Signal Received Quality (RSRQ), channel information, privacy, a network type, signal strength, and noise strength.

The WiFi positioning server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, channel information, Privacy, Network type, latitude and longitude coordinates of the wireless AP, the name of building at which the wireless AP is located, the floor number of the building, the detailed indoor location information (GPS coordinate available) of the building, an AP owner's address, a phone number, and the like. In this case, in order to remove wireless APs provided using a mobile AP or an illegal MAC address during a location determining process, the Wi-Fi positioning server may extract only a predetermined number of wireless AP information in order of high RSSI.

Then, the Wi-Fi positioning server may extract (analyze) location information of the mobile terminal 100 using at least one wireless AP information extracted from the database. The location information of the mobile terminal 100 may be extracted (or analyzed) by comparing the included information and the received wireless AP information.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by the mobile terminal, as a position of the mobile terminal. The Cell-ID method is an implementation that is minimally complex, does not require additional costs, and location information may be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is necessary for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of the mobile terminal using a known landmark transmitter.

In addition to these position location methods, various algorithms may be used to extract (analyze) location information of a mobile terminal.

Such extracted location information of the mobile terminal 100 may be transmitted to the mobile terminal 100 through the Wi-Fi positioning server, thereby acquiring location information of the mobile terminal 100.

The mobile terminal 100 may acquire location information by being connected with at least one wireless AP. The number of wireless APs required to acquire location information of the mobile terminal 100 may be variously changed according to a wireless communication environment within which the mobile terminal 100 is positioned.

Various embodiments described herein may be implemented in a computer-readable medium, a machine-readable medium, or similar medium using, for example, software, hardware, or any combination thereof.

Figure 2:
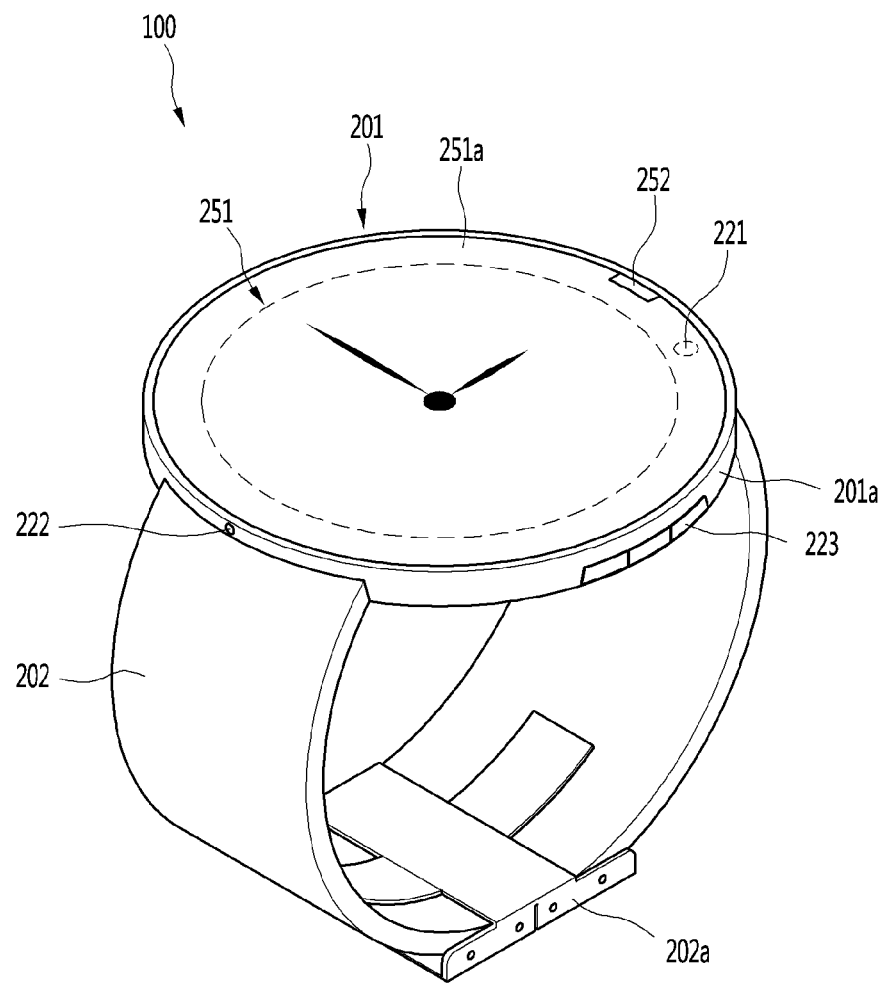
FIG. 2 is a perspective view illustrating one example of the watch-type mobile terminal related to the present invention.

FIG. 2 is a perspective view illustrating one example of the watch-type mobile terminal related to the present invention.

The watch-type mobile terminal 100 illustrated in FIG. 2 may include all components included in FIG. 1.

The display unit 251 of the watch-type mobile terminal 100 illustrated in FIG. 2 may have a circular shape, but the present invention is not limited thereto. The display unit 251 may have an oval shape or a rectangular shape. The shape of the display unit 251 of the present invention may have various shapes sufficient to provide a visually good image for a user and to help the user manipulate the display unit 251.

Referring to FIG. 2, the watch-type mobile terminal 100 includes a main body 201 including the display unit 251 and a band 202 coupled to the main body 201 and configured to be worn on the wrist. The display unit 251 may correspond to the touch screen 151 of FIG. 1.

The main body 201 includes a case that forms an outer appearance. As shown in drawing, the case may include a first case 201a and a second case 201b which define an internal space for receiving various electronic components. However, the present invention is not limited thereto, but one case is included to provide the internal space, so that the watch-type mobile terminal 100 may be realized in the form of a unibody.

The watch-type mobile terminal 100 may be configured to enable wireless communication, and the main body 201 may be equipped with an antenna for wireless communication. Meanwhile, the performance of the antenna may be enhanced through the case. For example, a case including a conductive material may be configured to electrically be connected with the antenna and thus to expand the ground or a radiation area.

The display unit 251 may be disposed on the front surface of the main body 201 to output information. The display unit 251 may include a touch sensor so that the display unit 251 may be realized as a touch screen. As illustrated in drawings, a window 251a of the display unit 251 may be mounted on the first case 201a to form a front surface of a terminal body together with the first case 201a. The case may be referred to as a bezel.

The main body 201 may include a sound output unit 252, a camera 221, a microphone 222, a user input unit 223, and the like. In the case that the display unit 251 is realized as a touch screen, the display unit 251 may serve as a user input unit 223. Accordingly, the main body 201 may not have a separate key.

The band 202 is worn on the wrist to surround a wrist, and may be formed of a flexible material for easy wearing. For example, the band 202 may be formed of leather, rubber, silicone, synthetic resin material, or the like. In addition, the band 210 is provided detachably from the main body 201. Accordingly, the band 202 may be replaceable with various shapes of bands according to the preferences of a user.

Meanwhile, the band 202 may be used to expand the performance of the antenna. For example, the band 202 may include a ground extension part (not illustrated) that is electrically connected to the antenna to expand the ground area.

The band 202 may include a fastener 202a. The fastener 202a may be by a buckle, a snap-fit hook structure, or Velcro (trademark), and may include a section having elasticity or elastic material. The present drawing illustrates an example that the fastener 202a is realized in the shape of a buckle.

Figure 3:
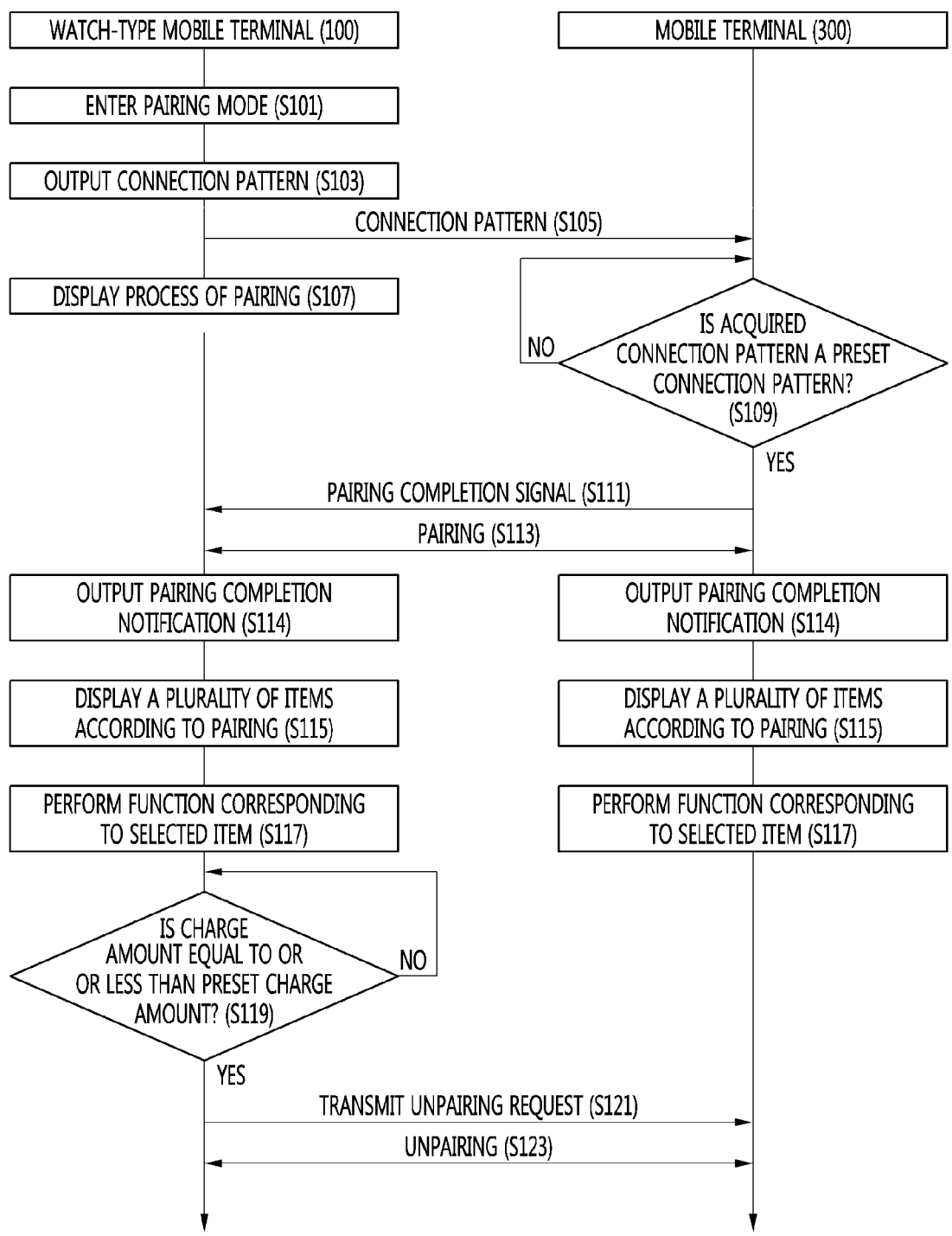
FIG. 3 is a ladder diagram for explaining an operation method between a watch-type mobile terminal and a mobile terminal, according to an embodiment of the present invention.

FIG. 3 is a ladder diagram for explaining an operation method between the watch-type mobile terminal and a mobile terminal, according to an embodiment of the present invention.

The control unit 180 of the watch-type mobile terminal 100 converts an operation mode of the watch-type mobile terminal 100 into a pairing mode (S101). In an embodiment, the pairing mode may be a mode capable of connecting the watch-type mobile terminal 100 to one or more mobile terminals around the watch-type mobile terminal 100. As the watch-type mobile terminal 100 enters the pairing mode, the control unit 180 may attempt to perform pairing with the one or more mobile terminals around the watch-type mobile terminal 100 through the short-range communication module 114. The pairing may indicate that mobile terminals are connected to each other through short-range wireless communication.

In an embodiment, when the power of the watch-type mobile terminal 100 is turned on, the control unit 180 may convert the operation mode of the watch-type mobile terminal 100 into the pairing mode.

In another embodiment, the control unit 180 may convert the operation mode of the watch-type mobile terminal 100 into the pairing mode according to user input.

As the watch-type mobile terminal 100 enters the pairing mode, the control unit 180 outputs a connection pattern (S103). The output connection pattern is transmitted to a mobile terminal 300 around the watch-type mobile terminal 100 (S105). The connection pattern may be a pattern used in requesting the mobile terminal 300 around the watch-type mobile terminal 100 for the pairing. The mobile terminal 300 around the watch-type mobile terminal 100 may include all elements illustrated in FIG. 1

In an embodiment, the connection pattern may be a sound pattern. The sound pattern may be any one of a song and a ringtone, having a certain playback section. When the watch-type mobile terminal 100 enters the pairing mode, the control unit 180 may control the audio output module 152 to output a sound pattern. The control unit 180 may output a sound pattern into which a pairing request code is inserted. The pairing request code may be a numeric code for pairing between mobile terminals. The sound pattern will be described with reference to the following drawings.

Figure 4:
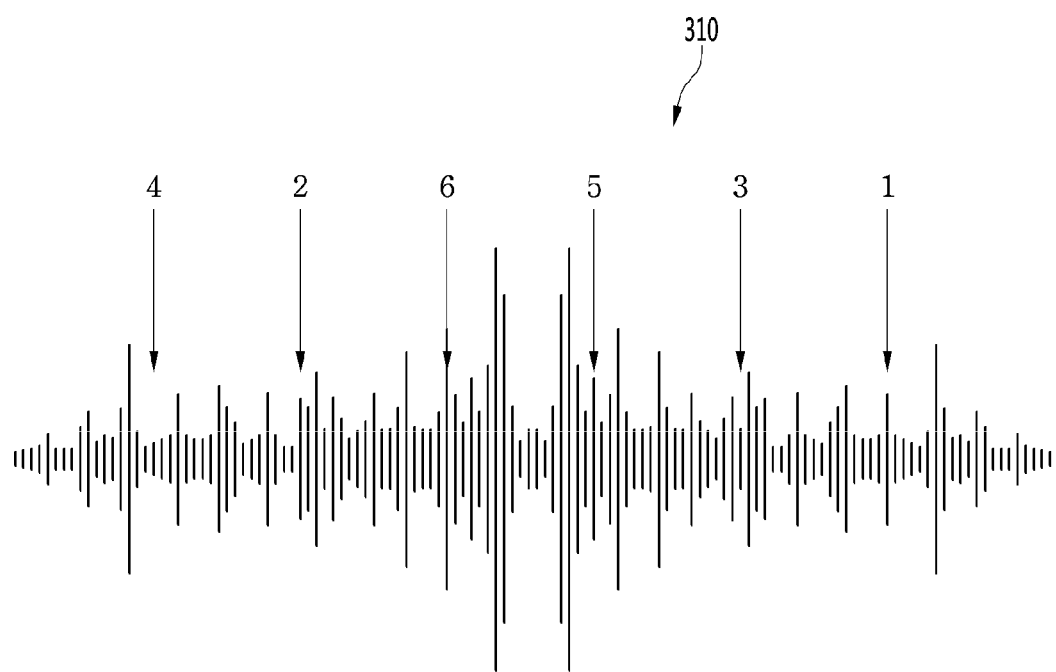
FIG. 4 is a diagram illustrating a sound pattern recognizable as a pairing request signal, according to an embodiment of the present invention.

FIG. 4 is a diagram illustrating a sound pattern recognizable as a pairing request signal, according to an embodiment of the present invention.

In order for pairing with the mobile terminal 300, the control unit 180 of the watch-type mobile terminal 100 may control the audio output module 152 to output a sound pattern 310 as shown in FIG. 4. A pairing request code "426531" may be inserted into the sound pattern 310. A pairing request code may be inserted into the sound pattern 310 as a means for authenticating pairing. Each of a plurality of unit codes constituting a pairing request code may correspond to each of a plurality of sound signal sections constituting the sound pattern 310. Each of the unit codes may be inserted so as to correspond to intensity or a length of each of the sound signal sections. For example, a unit code "1" may be mapped to the note "doh", and a unit code "2" may be mapped to the note "ray". The mobile terminal 300 may acquire the sound pattern 310 output from the watch-type mobile terminal 100 and may extract the pairing request code "426531" inserted into the acquired sound pattern 310. When a pairing request code inserted into the sound pattern 310 matches a preset pairing request code, the mobile terminal 300 may transmit a pairing completion signal to the watch-type mobile terminal 100. Even in the same melody, when a pairing request code is not inserted into the same melody, the mobile terminal 300 may not perform pairing with the watch-type mobile terminal 100. That is, as a pairing request code is inserted into the sound pattern 310, security may be increased.

FIG. 3 will be described again.

In another embodiment, the connection pattern may be a vibration pattern. The vibration pattern may be a pattern in which a vibration having certain intensity is generated at certain time intervals. When the watch-type mobile terminal 100 enters the pairing mode, the control unit 180 may control the haptic module 153 to output a vibration pattern.

FIG. 5 is a diagram illustrating a vibration pattern recognizable as a pairing request signal, according to another embodiment of the present invention.

Referring to FIG. 5, first and second type vibration patterns for pairing are illustrated. In a graph of each of the first and second type vibration patterns, a horizontal axis is a time axis, and a vertical axis is a vibrational intensity axis indicating intensity of a vibration. Each of the first and second type vibration patterns may have a pattern, vibrational intensity of which varies at certain time intervals. When each of the first and second type vibration patterns output from the watch-type mobile terminal 100 is a preset vibration pattern, the mobile terminal 300 may be connected to the watch-type mobile terminal 100.

FIG. 3 will be described again.

In another embodiment, the connection pattern may be a preset voice command of a user. A voice command may be a preset voice command such as a voice command "Hi, LG". The watch-type mobile terminal 100 and the mobile terminal 300 may receive the same voice command through the microphone, and the watch-type mobile terminal 100 and the mobile terminal 300 receiving the same voice command may be paired with each other.

In another embodiment, the connection pattern may be a combination pattern of a sound pattern and a vibration pattern.

Meanwhile, while the control unit 180 outputs the connection pattern, the control unit 180 displays a process of pairing on the display unit 251, the process of the pairing indicating a degree in which pairing with the mobile terminal 300 proceeds (S107). In an embodiment, the control unit 180 may control the display unit 251 to display the process of the pairing on a chronograph displayed in one region of a watch screen of the display unit 251.

In another embodiment, the control unit 180 may control the display unit 251 to display the process of the pairing on the watch screen of the display unit 251.

The process of the pairing may also be displayed on the mobile terminal 300 with which the watch-type mobile terminal 100 is to be paired.

The mobile terminal 300 confirms whether the connection pattern output from the watch-type mobile terminal 100 is a preset connection pattern (S109). When it is confirmed that the output connection pattern is the preset connection pattern, the mobile terminal 300 transmits a pairing completion signal to the watch-type mobile terminal 100 (S111). The mobile terminal 300 stores the preset connection pattern in a memory. A control unit of the mobile terminal 300 may compare the connection pattern output from the watch-type mobile terminal 100 with the preset connection pattern. As a comparison result, when the output connection pattern matches the preset connection pattern, the control unit of the mobile terminal 300 may transmit the pairing completion signal to the watch-type mobile terminal 100 through a short-range communication module.

The watch-type mobile terminal 100 is paired with the mobile terminal 300 according to the received pairing completion signal (S113).

Each of the watch-type mobile terminal 100 and the mobile terminal 300 outputs a pairing completion notification indicating that the pairing is completed (S114).

Each of the watch-type mobile terminal 100 and the mobile terminal 300 displays a plurality of items according to the pairing (S115), and performs a function corresponding to an item selected from the plurality of items (S117).

Operations S101 to S117 will be described in detail with reference to the following drawings.

FIGS. 6A to 6D are diagrams illustrating a process in which the watch-type mobile terminal outputs a sound pattern to perform pairing with the mobile terminal, according to an embodiment of the present invention.

Figure 6A:
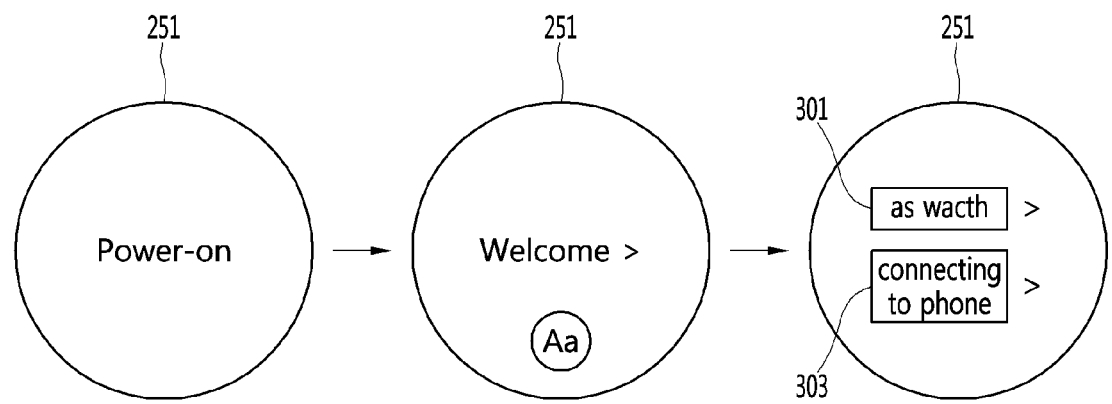
FIGS. 6A to 6D are diagrams illustrating a process in which a watch-type mobile terminal outputs a sound pattern to perform pairing with a mobile terminal, according to an embodiment of the present invention.
Figure 6B:
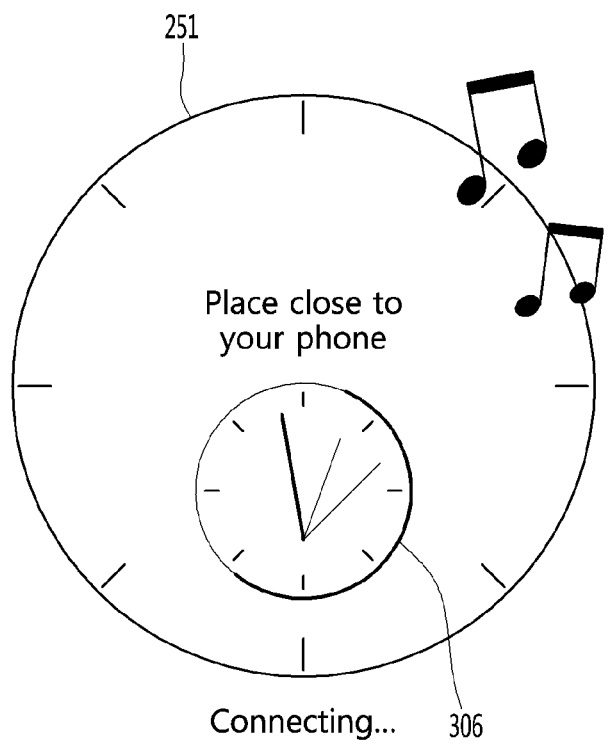

Referring to FIG. 6A, after the power of the watch-type mobile terminal 100 is turned on, the display unit 251 of the watch-type mobile terminal 100 may display a welcome message. After that, the display unit 251 may display a watch use tap 301 and a pairing tab 303, the watch use tap 301 indicating whether to use the watch-type mobile terminal 100 as a watch, and the pairing tab 303 indicating whether to connect the watch-type mobile terminal 100 to a mobile phone to use the watch-type mobile terminal 100. When the pairing tab 303 is selected, as shown in FIG. 6B, the control unit 180 may outputs a preset sound pattern. In addition, while the control unit 180 displays the watch screen, the control unit 180 may control the display unit 251 to display a gauge 306 on a chronograph 305, the gauge 306 indicating the process of the pairing. As a duration time of the sound pattern increases, the gauge 306 may further rise. In addition, as a mobile terminal to be paired moves closer to the watch-type mobile terminal 100, the control unit 180 may allow the gauge 306 to more quickly rise. Furthermore, the control unit 180 may control the display unit 251 to display a text "place close to your phone" on the watch screen, the text "place close to your phone" guiding a user to place the watch-type mobile terminal 100 close to the mobile terminal to be paired.

Figure 6C:
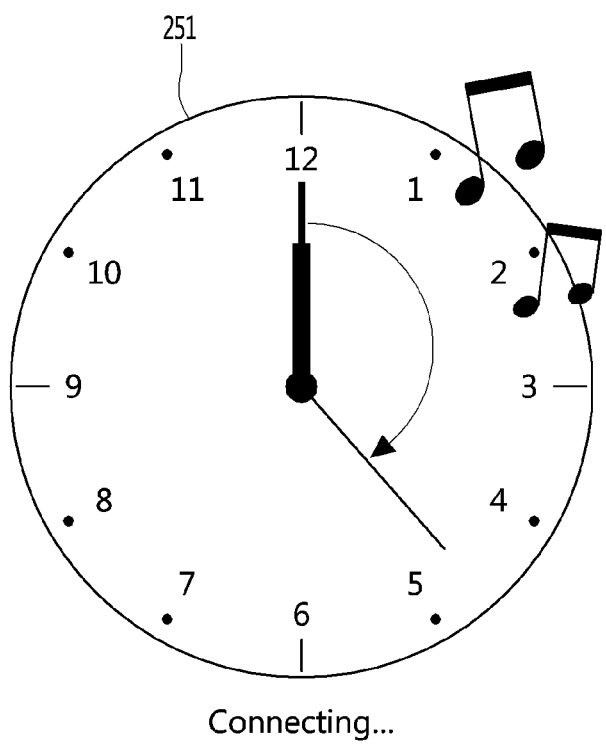
Figure 6D:
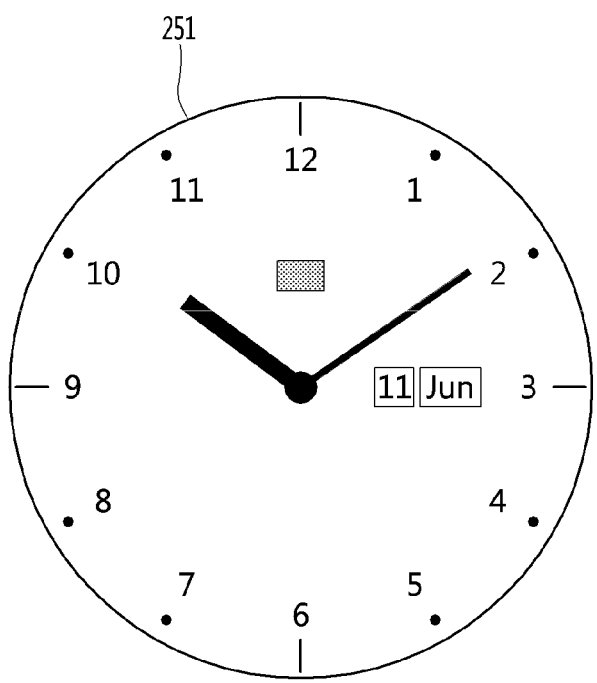

Meanwhile, the process of the pairing may be displayed using a second hand of the watch screen. That is, when the pairing tab 303 is selected, as shown in FIG. 6G, the control unit 180 may output the preset sound pattern and may control the display unit 251 to display the process of the pairing through the second hand of the watch screen. In this case, an hour hand and a minute hand may be fixed so as to point to 12, and only the second hand may move. In addition, as the pairing proceeds, the control unit 180 may adjust screen brightness of the display unit 251 so as to gradually become brighter. When the pairing between the watch-type mobile terminal 100 and the mobile terminal 300 is completed, as shown in FIG. 6D, the control unit 180 may change positions of the hour hand and the minute hand such that the watch screen shows a current time.

Hereinafter, a process in which the mobile terminal 300 acquires a sound pattern output from the watch-type mobile terminal 100 to perform pairing will be described.

FIGS. 7A to 7D are diagrams illustrating a process in which the mobile terminal acquires a sound pattern output from the watch-type mobile terminal to perform pairing, according to an embodiment of the present invention.

Figure 7A:
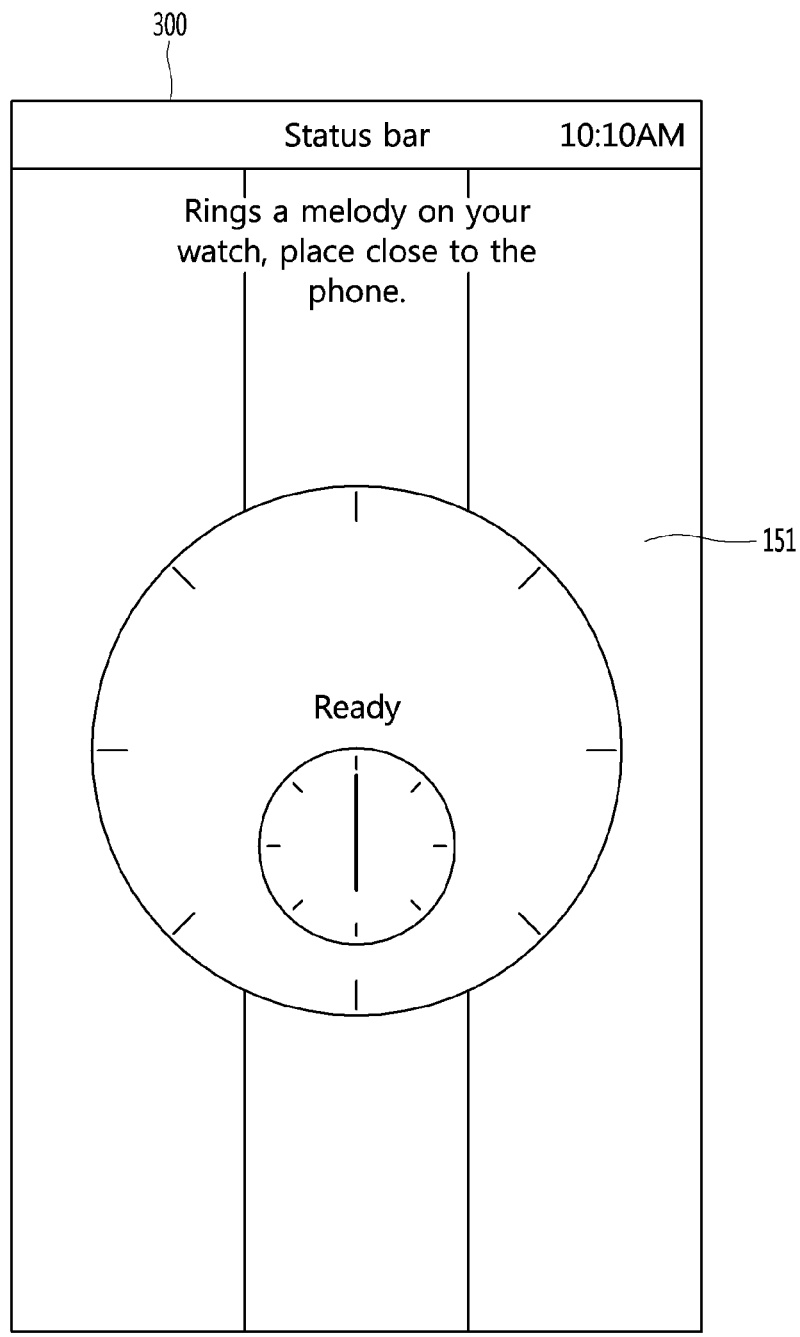

Referring to FIG. 7A, FIG. 7A shows a status of the mobile terminal 300 before the sound pattern is acquired from the watch-type mobile terminal 100. It is assumed that a watch manager application for pairing with the watch-type mobile terminal 100 is installed in the mobile terminal 300.

FIG. 7A shows an initial screen according to execution of the watch manager application. An image of the watch-type mobile terminal 100 may be displayed on a display unit 151 of the mobile terminal 300.

Figure 7C:
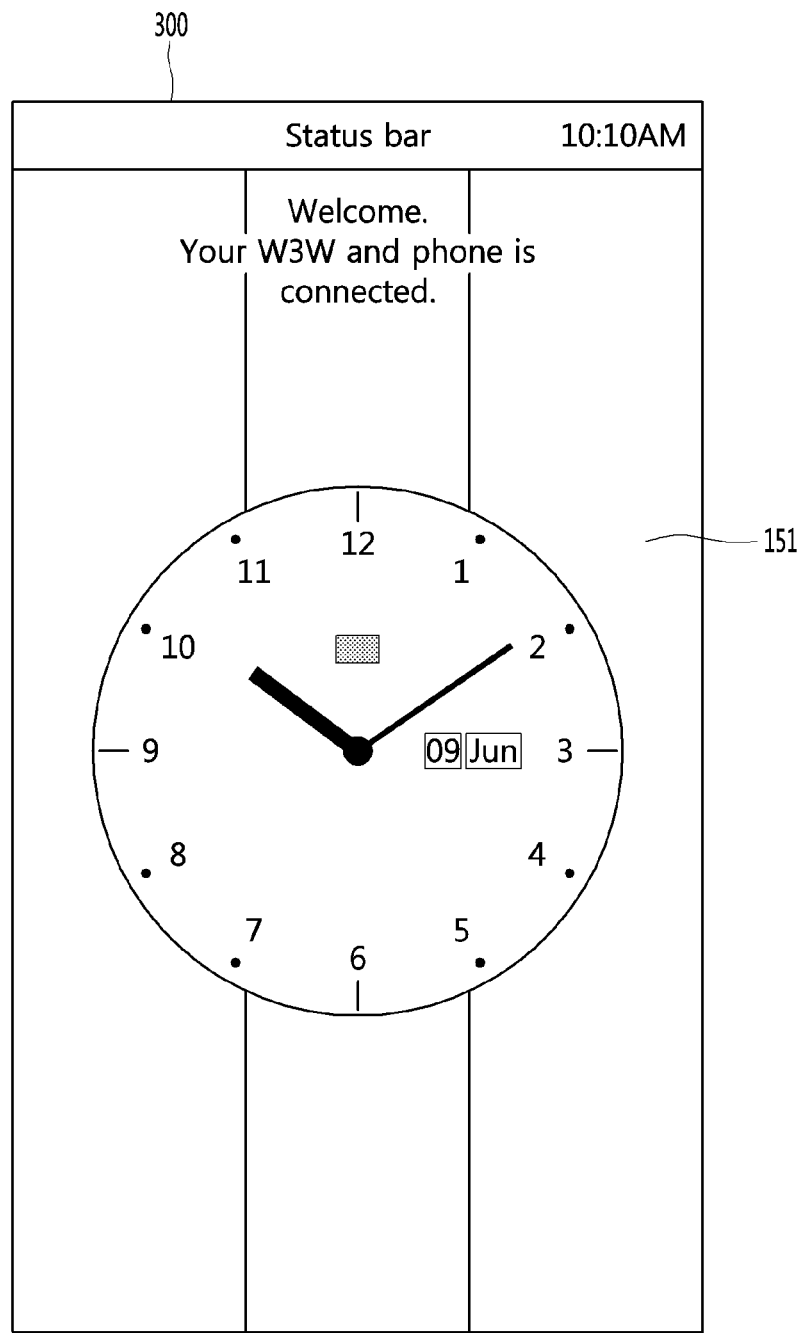
Figure 7D:
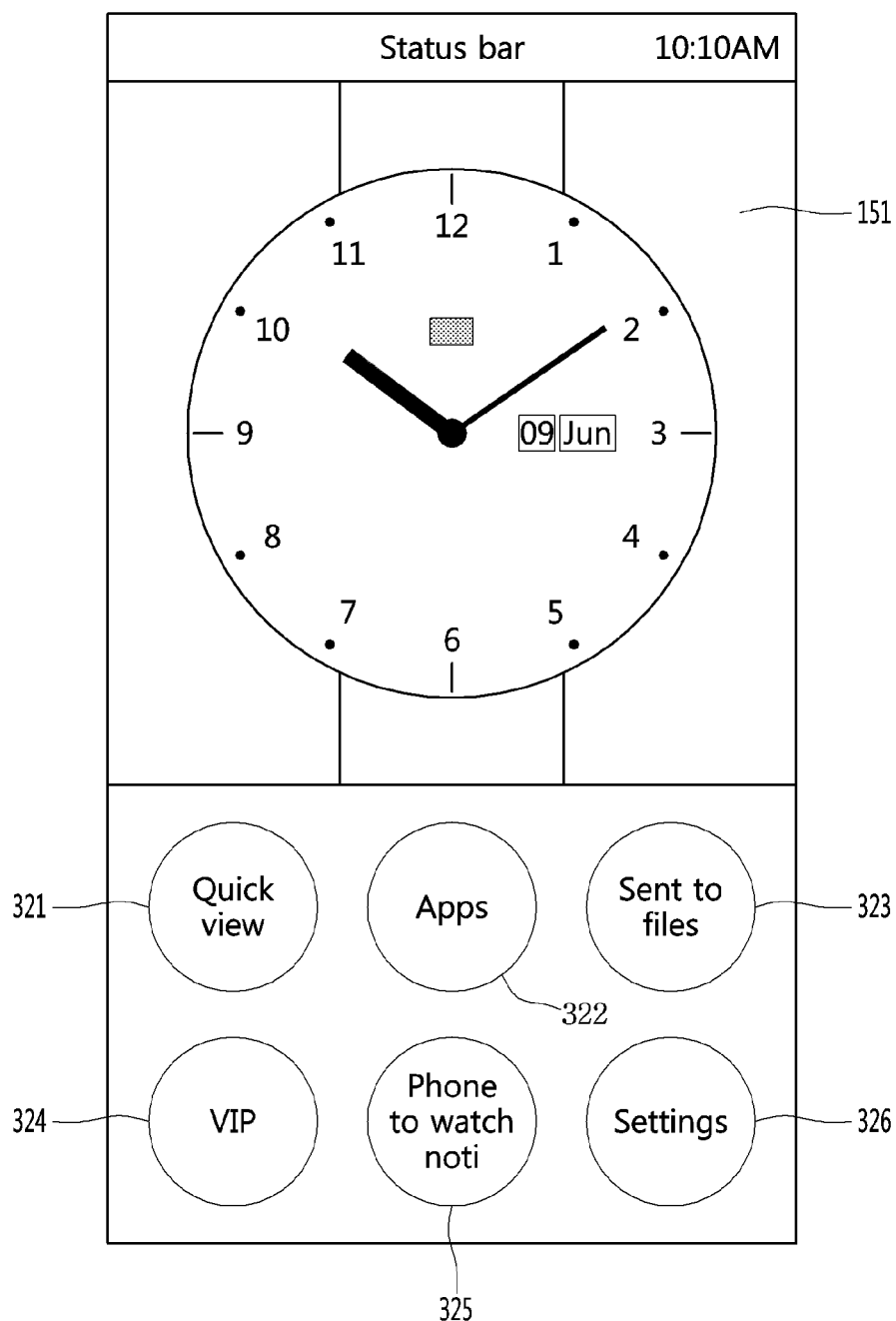

Referring to FIG. 7B, a control unit 180 of the mobile terminal 300 may acquire a sound pattern output from the watch-type mobile terminal 100 through a microphone. While the control unit 180 of the mobile terminal 300 displays a watch screen, the control unit 180 may control the display unit 151 to display a gauge 306 on a chronograph 305, the gauge 306 indicating a process of pairing. That is, the mobile terminal 300 may display the process of the pairing as shown in FIG. 6B. Of course, the mobile terminal 300 may display the process of the pairing as shown in FIG. 6C. When the acquired sound pattern is a preset pattern, as shown in FIG. 7C, the control unit 180 of the mobile terminal 300 may display a pairing completion notification indicating that the pairing with the watch-type mobile terminal 100 is completed. After that, the control unit 180 of the mobile terminal 300 may control the display unit 151 to display a plurality of items 321 to 326 usable during pairing. The plurality of items 321 to 326 may also be displayed on the display unit 251 of the watch-type mobile terminal 100.

Next, FIGS. 8A to 8C will be described.

Figure 8A:
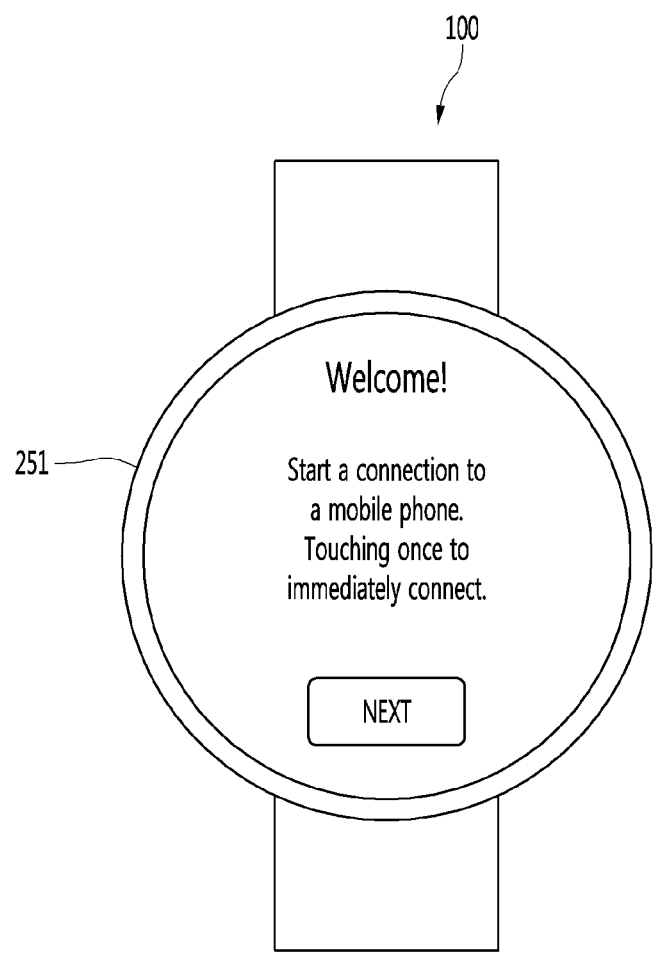
FIGS. 8A to 8C are diagrams illustrating a process in which a watch-type mobile terminal outputs a vibration pattern to perform pairing with a mobile terminal, according to another embodiment of the present invention.
Figure 8B:
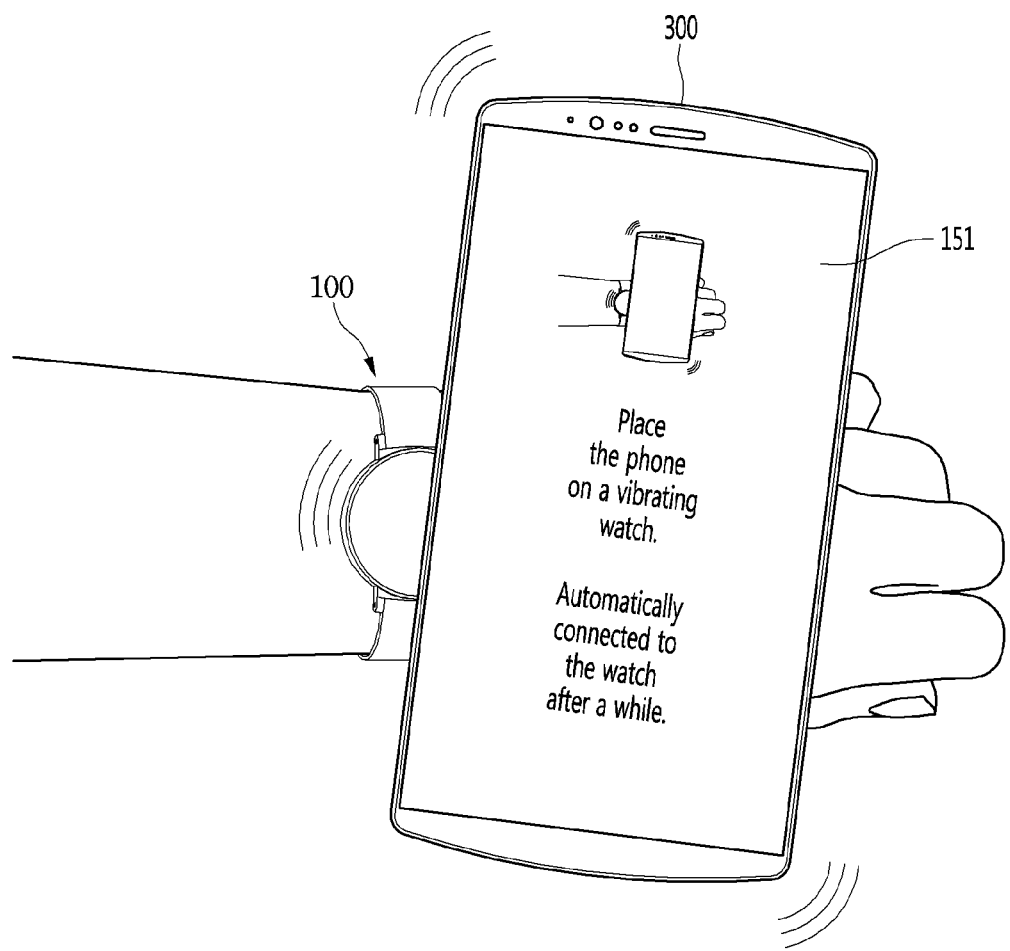
Figure 8C:
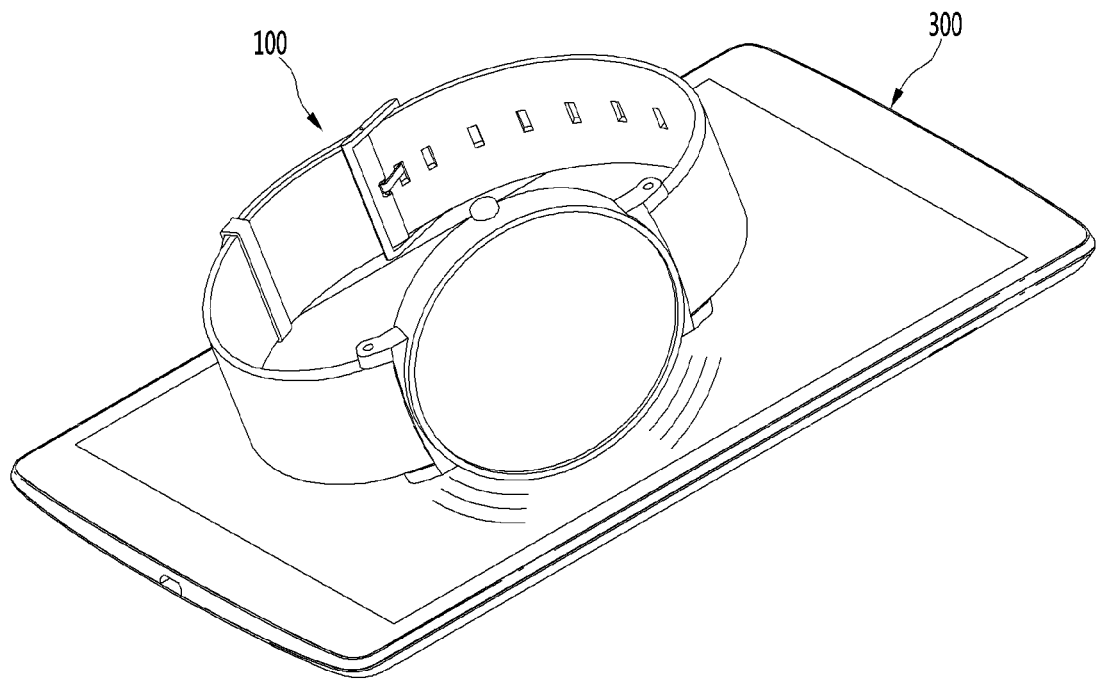

FIGS. 8A to 8C are diagrams illustrating a process in which the watch-type mobile terminal outputs a vibration pattern to perform pairing with the mobile terminal, according to another embodiment of the present invention.

Referring to FIG. 8A, FIG. 8A shows a screen of the display unit 251 before the watch-type mobile terminal 100 performs pairing with the mobile terminal through a vibration pattern. The display unit 251 may display a text inducing a connection with the mobile terminal 300. When a "next" button is selected on a screen of the display unit 251, in order for pairing, the control unit 180 may control the haptic module 253 to output a preset vibration pattern. Referring to FIG. 8B, the mobile terminal 300 may display a message "place the mobile terminal 300 to the watch-type mobile terminal 100" on the display unit 151 so as to acquire a vibration pattern output from the watch-type mobile terminal 100. A user may allow to two mobile terminals, i.e., the watch-type mobile terminal 100 and the mobile terminal 300 to be paired with each other just through a motion of placing the mobile terminal 300 to the watch-type mobile terminal 100 outputting the vibration pattern.

Meanwhile, when the watch-type mobile terminal 100 is placed on the mobile terminal 300, the watch-type mobile terminal 100 may be connected to the mobile terminal 300 through the vibration pattern. Referring to FIG. 8C, the watch-type mobile terminal 100 is placed on the mobile terminal 300 in a state of being not worn by a user. The watch-type mobile terminal 100 may output the preset vibration pattern, and when the mobile terminal 300 acquires the output vibration pattern and grasps that the acquired vibration pattern is the preset vibration pattern, the mobile terminal 300 may be paired with the watch-type mobile terminal 100.

Next, a process in which the watch-type mobile terminal 100 and the mobile terminal 300 perform pairing through a voice command of a user will be described.

FIGS. 9A to 9C are diagrams illustrating a process in which the watch-type mobile terminal 100 and the mobile terminal 300 perform pairing through a voice command of a user, according to an embodiment of the present invention.

Referring to FIG. 9A, a user may speak a voice command "Hi LG! Connect". Each of the watch-type mobile terminal 100 and the mobile terminal 300 may receive a voice command, and when the received voice command is a preset voice command, the watch-type mobile terminal 100 and the mobile terminal 300 may perform pairing. That is, the watch-type mobile terminal 100 and the mobile terminal 300 may recognize a voice command as a trigger for pairing and may be connected to each other by exchanging a pairing request signal. According to embodiments of the present invention, other mobile terminals 300-1 and 300-2 in addition to the mobile terminal 300 may be placed around the watch-type mobile terminal 100. Each of the mobile terminals may receive a voice command to grasp intensity of the received voice command. In addition, each of the mobile terminals may grasp a distance between mobile terminals placed therearound based on signal intensity through short-range communication. Among mobile terminals receiving a voice command, two mobile terminals disposed closest to each other and grasping the greatest voice command intensity, i.e., the watch-type mobile terminal 100 and the mobile terminal 300 may be automatically connected to each other.

Next, FIG. 9B will be described.

Referring to FIG. 9B, each of the watch-type mobile terminal 100 and the mobile terminal 300 may receive a voice command "Hi LG! Connect". When the received voice command is a preset voice command for pairing, each of the watch-type mobile terminal 100 and the mobile terminal 300 may enter a pairing standby status. Each of the watch-type mobile terminal 100 and the mobile terminal 300 may display a text "touch a screen" on the display unit. When touch input of a user is received, the watch-type mobile terminal 100 and the mobile terminal 300 may be connected to each other. That is, in addition to a voice command, when additional input of a user is further received in order for pairing, the watch-type mobile terminal 100 and the mobile terminal 300 may be connected to each other. The touch input of the user has been exemplified as the additional input for connecting the watch-type mobile terminal 100 and the mobile terminal 300 to each other, but the present invention is not limited thereto. A case where specific gesture input is received or a motion of shaking each mobile terminal is sensed may also be an example of the additional input.

Meanwhile, as shown in FIG. 9C, each of the watch-type mobile terminal 100 and the mobile terminal 300 may receive a voice command "Hi LG! Disconnect" for disconnection from a user. When the received voice command is a command for disconnection, the watch-type mobile terminal 100 and the mobile terminal 300 paired with each other may be disconnected from each other.

According to another embodiment of the present invention, when the watch-type mobile terminal 100 and the mobile terminal 300 are paired with each other, an application corresponding to a kind of connection pattern, i.e., a base of pairing may be executed on each of the watch-type mobile terminal 100 and the mobile terminal 300.

Figure 10A:
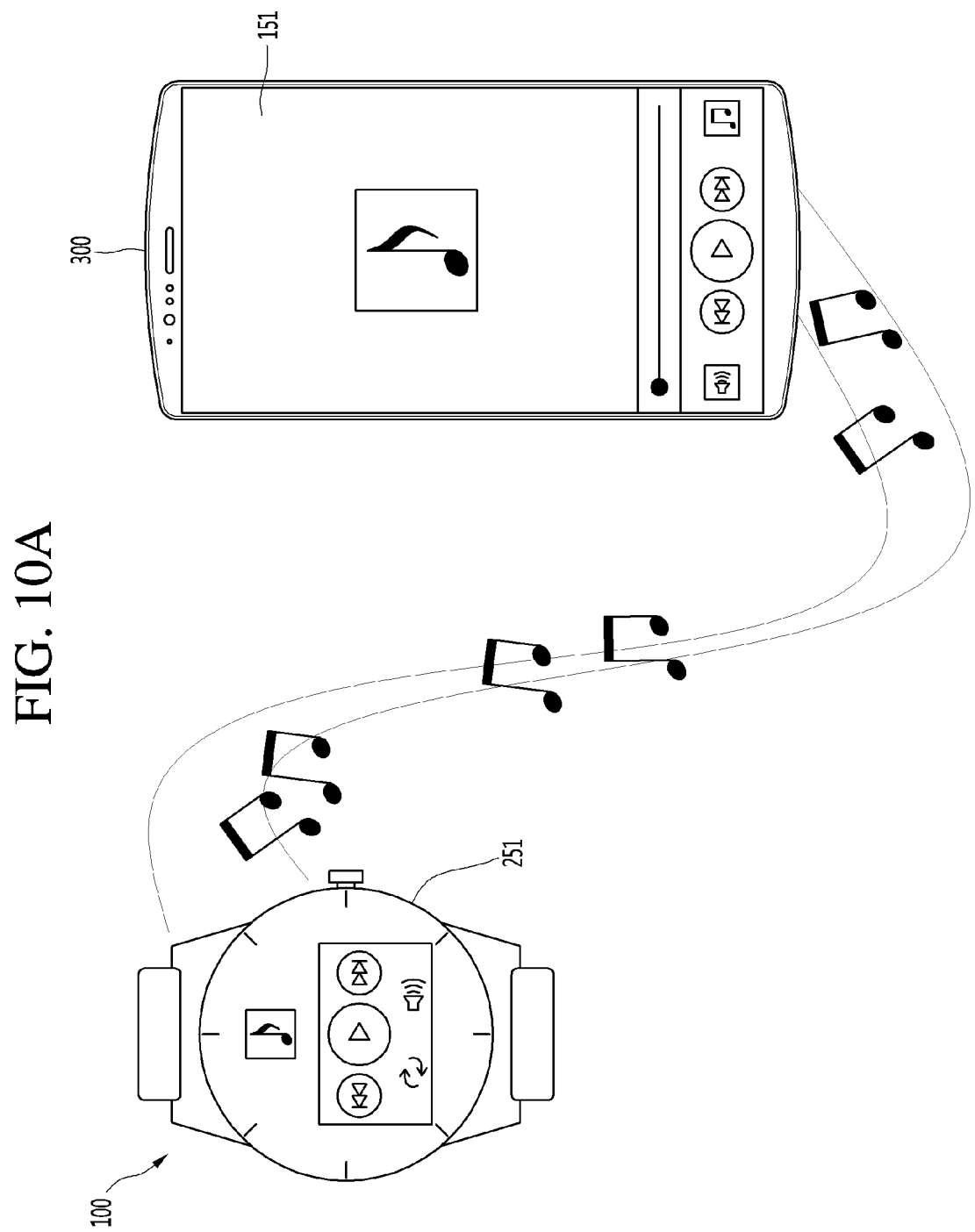

FIGS. 10A and 10B are diagrams illustrating an example in which applications corresponding to kinds of connection patterns are executed on paired devices, according to various embodiments of the present invention.

Referring to FIG. 10A, the watch-type mobile terminal 100 and the mobile terminal 300 may be connected to each other through a sound pattern. As the watch-type mobile terminal 100 and the mobile terminal 300 are connected to each other through the sound pattern, the watch-type mobile terminal 100 and the mobile terminal 300 may execute a music application. Therefore, at least one of the display unit 251 of the watch-type mobile terminal 100 and the display unit 151 of the mobile terminal 300 may display an execution screen of the music application. A playback control window for controlling a playback of music may be displayed on the execution screen of the music application. A user may control a playback of music output on the mobile terminal 300 through the watch-type mobile terminal 100.

Next, referring to FIG. 10B, the watch-type mobile terminal 100 and the mobile terminal 300 may be connected to each other through a vibration pattern. As the watch-type mobile terminal 100 and the mobile terminal 300 are connected to each other through a specific pattern, the watch-type mobile terminal 100 and the mobile terminal 300 may execute an exercise application. Therefore, at least one of the display unit 251 of the watch-type mobile terminal 100 and the display unit 151 of the mobile terminal 300 may display an execution screen of the exercise application. Exercise information providing a daily step count of a user, a goal step count, and the like may be displayed on the execution screen of the exercise application.

FIGS. 10A and 10B are a mere example. A user may preset an application that is to be executed so as to correspond to a specific connection pattern. When the watch-type mobile terminal 100 and the mobile terminal 300 are paired with each other through the specific connection pattern, each of the watch-type mobile terminal 100 and the mobile terminal 300 may execute an application corresponding to the specific connection pattern.

According to another embodiment of the present invention, function setting of each of the watch-type mobile terminal 100 and the mobile terminal 300 may be automatically changed according to the connection pattern between the watch-type mobile terminal 100 and the mobile terminal 300.

Figure 11A:
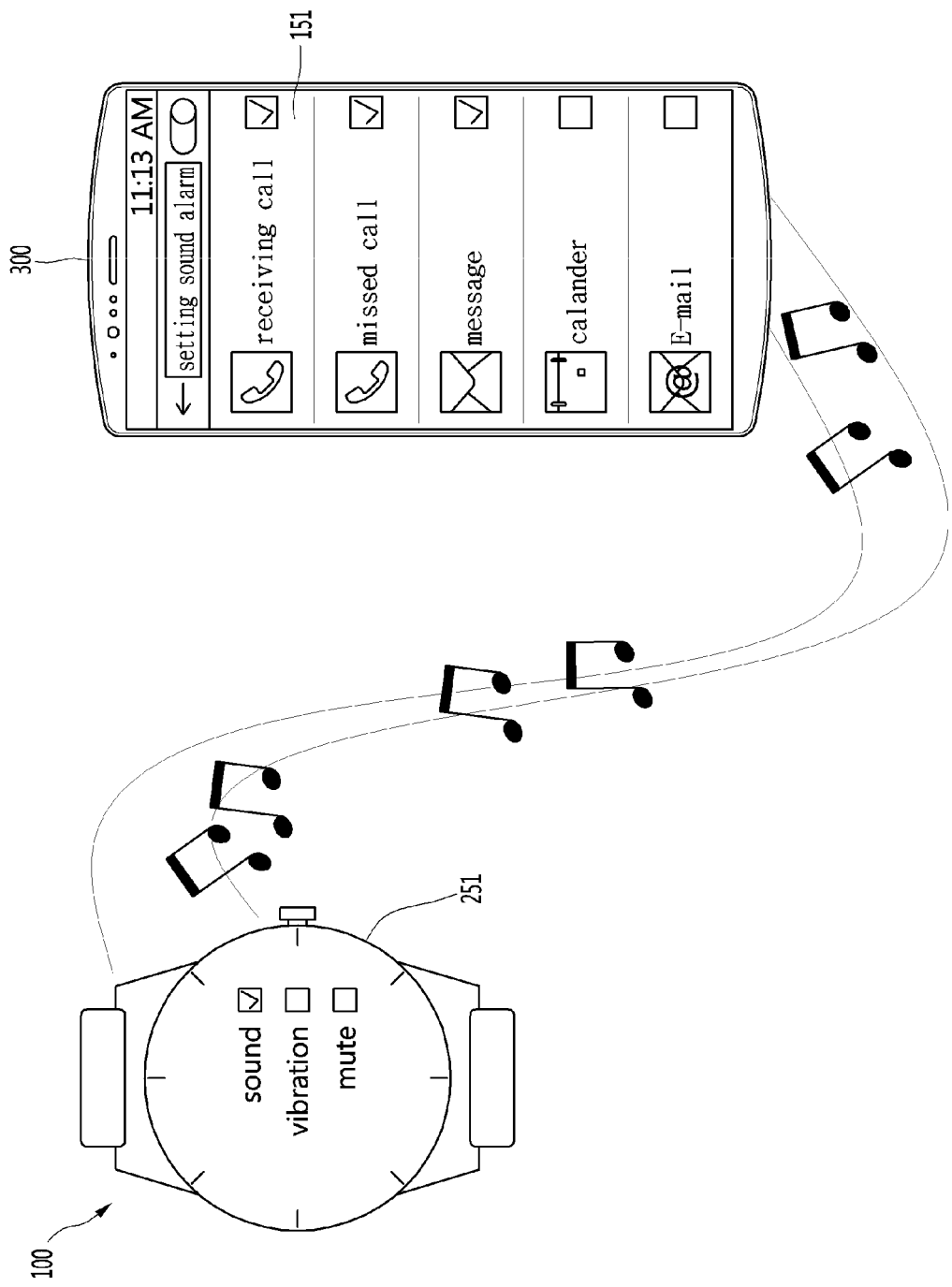
FIGS. 11A and 11B are diagrams illustrating an example in which function setting of each of a watch-type mobile terminal and a mobile terminal is automatically changeable based on a connection pattern between the watch-type mobile terminal and the mobile terminal, according to various embodiments of the present invention.
Figure 11B:
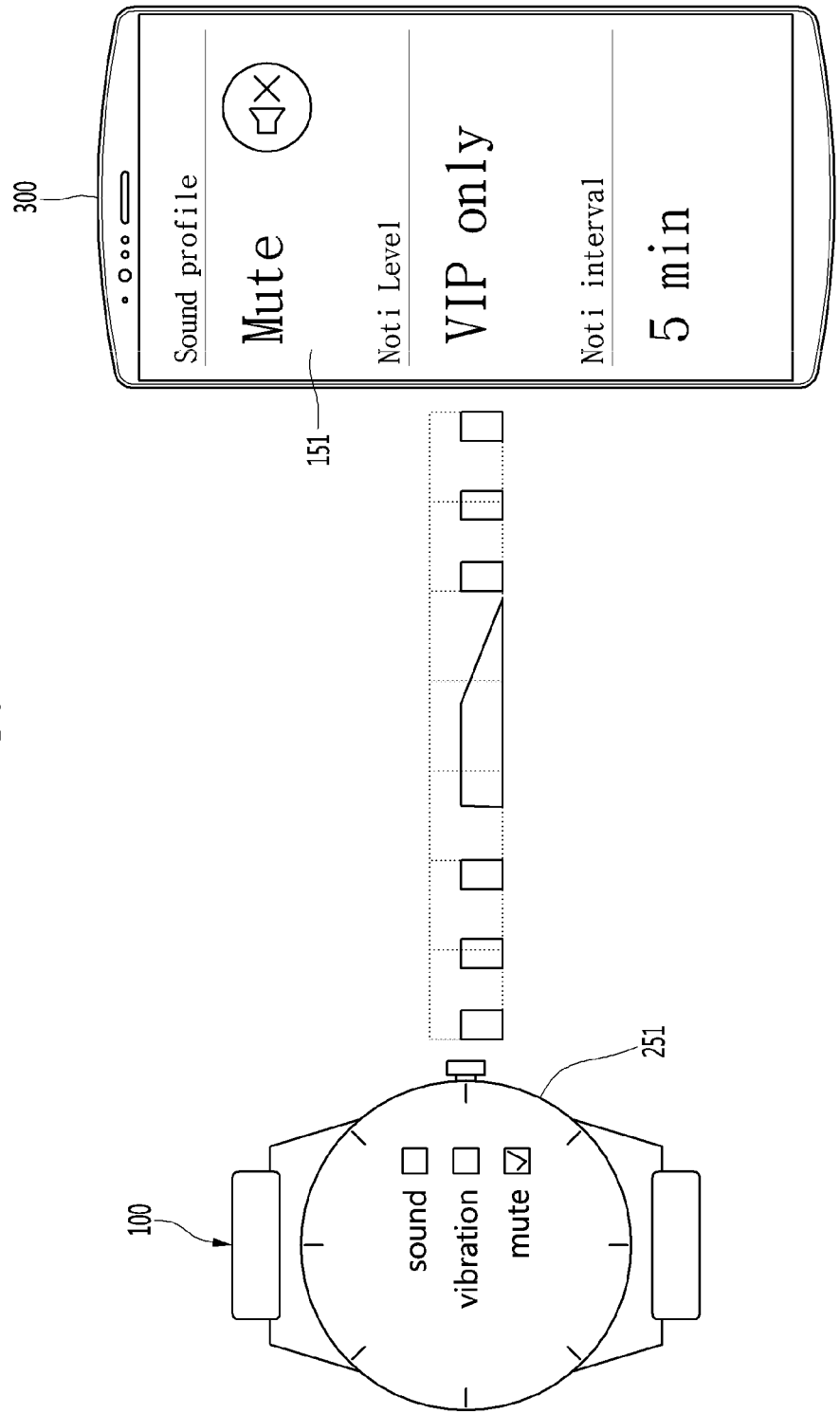

FIGS. 11A and 11B are diagrams illustrating an example in which function setting of each of the watch-type mobile terminal and the mobile terminal is automatically changeable based on the connection pattern between the watch-type mobile terminal and the mobile terminal, according to various embodiments of the present invention.

Referring to FIG. 11A, the watch-type mobile terminal 100 and the mobile terminal 300 may be connected to each other through a sound pattern. As the watch-type mobile terminal 100 and the mobile terminal 300 are connected to each other through the sound pattern, at least one of sound setting and alarm setting of each of the watch-type mobile terminal 100 and the mobile terminal 300 may be automatically changed. For example, when the watch-type mobile terminal 100 and the mobile terminal 300 are connected to each other through the sound pattern, the watch-type mobile terminal 100 may be set to output a ringtone when receiving a call signal and may be set to output all of received alarms. This may also be applied to the mobile terminal 300. In addition, when the watch-type mobile terminal 100 and the mobile terminal 300 are connected to each other through the sound pattern, the mobile terminal 300 may display an alarm setting screen for selecting whether to output an alarm on each application, on the display unit 151.

Next, FIG. 11B will be described.

Referring to FIG. 11B, the watch-type mobile terminal 100 and the mobile terminal 300 may be connected to each other through a vibration pattern. As the watch-type mobile terminal 100 and the mobile terminal 300 are connected to each other through the vibration pattern, at least one of sound setting and alarm setting of each of the watch-type mobile terminal 100 and the mobile terminal 300 may be automatically changed. For example, when the watch-type mobile terminal 100 and the mobile terminal 300 are connected to each other through the vibration pattern, the watch-type mobile terminal 100 may be set to be in a silent mode when receiving a call signal and may be set to output only important alarms of all of received alarms. This may also be applied to the mobile terminal 300. In addition, the mobile terminal 300 may display an alarm cycle setting screen for setting an update cycle of an alarm on the display unit 151.

According to another embodiment of the present invention, the mobile terminal 300 may be paired with the watch-type mobile terminal 100 by photographing the watch-type mobile terminal 100. When the mobile terminal 300 and the watch-type mobile terminal 100 are paired with each other through the photographing, the mobile terminal 300 may intactly display a screen displayed by the watch-type mobile terminal 100 or may remotely control the watch-type mobile terminal 100. This will be described with reference to FIGS. 12A and 12B.

Figure 12A:
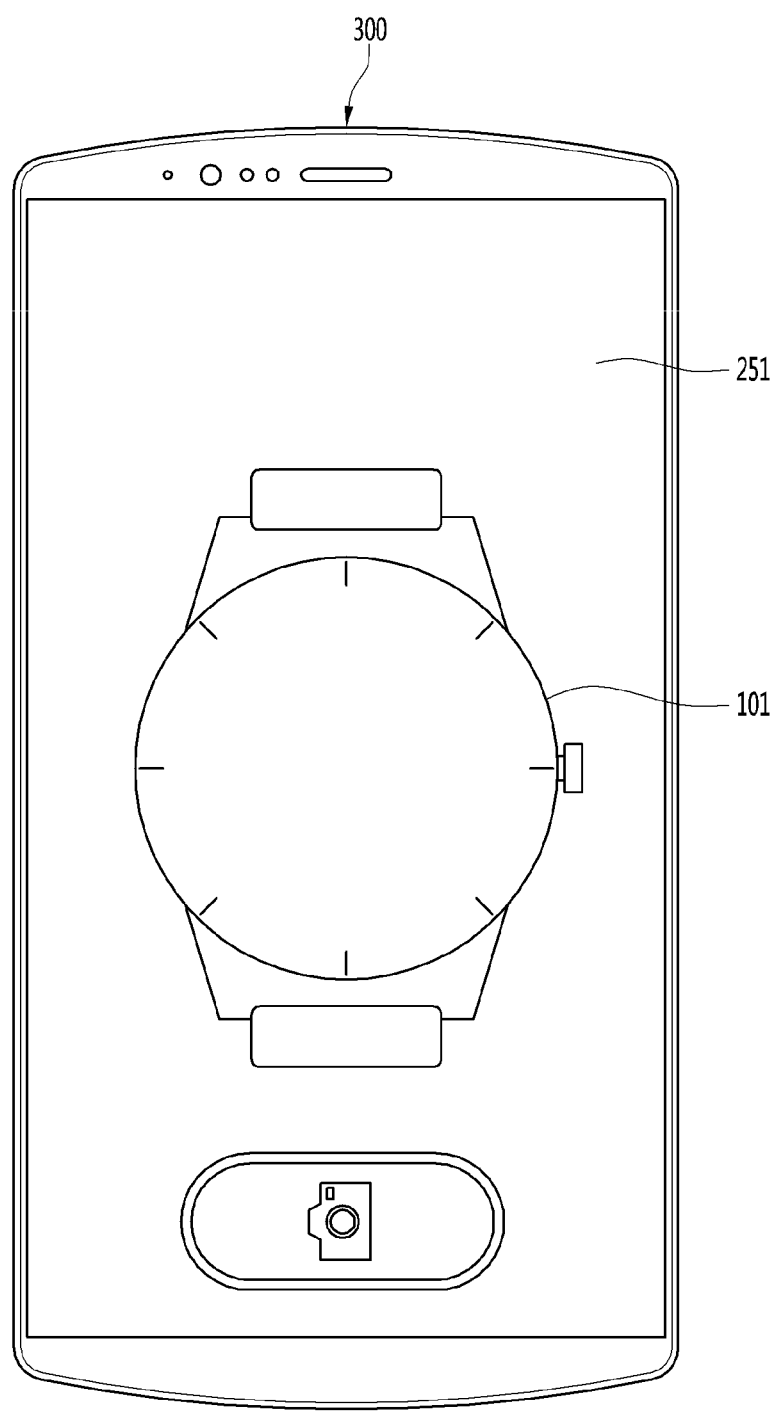
FIGS. 12A and 12B are diagrams illustrating scenarios executable when a watch-type mobile terminal and a mobile terminal are connected through camera photographing, according to an embodiment of the present invention.
Figure 12B:
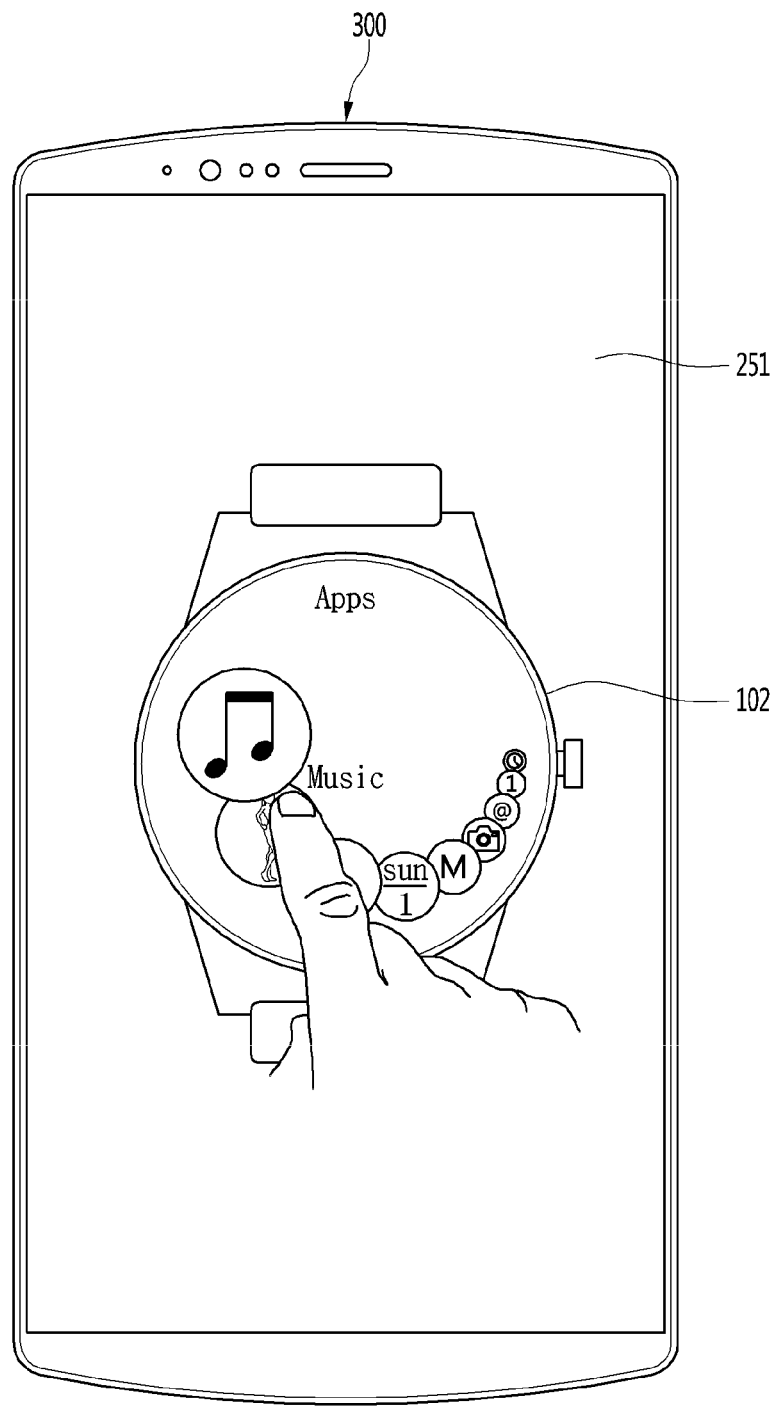

FIGS. 12A and 12B are diagrams illustrating scenarios executable when the watch-type mobile terminal and the mobile terminal are connected through camera photographing, according to an embodiment of the present invention.

Referring to FIG. 12A, the mobile terminal 300 may operate in a photographing mode to display a preview screen of the display unit 251. An image 101 of the watch-type mobile terminal 100 may be displayed on the preview screen. The mobile terminal 300 may capture the image 101 of the watch-type mobile terminal 100, and when the captured image 101 matches a preset image, the mobile terminal 300 may be paired with the watch-type mobile terminal 100. When the watch-type mobile terminal 100 and the mobile terminal 300 are paired with each other through the photographing, as shown in FIG. 12B, the mobile terminal 300 may intactly display a screen displayed by the watch-type mobile terminal 100, on the display unit 251. A user may view a screen that is being displayed through the watch-type mobile terminal 100, through the mobile terminal 300. In addition, the mobile terminal 300 may remotely control the watch-type mobile terminal 100 by receiving user input.

According to another embodiment of the present invention, each of the watch-type mobile terminal 100 and the mobile terminal 300 may enter a specific user mode according to a connection pattern between the watch-type mobile terminal 100 and the mobile terminal 300.

Figure 13A:
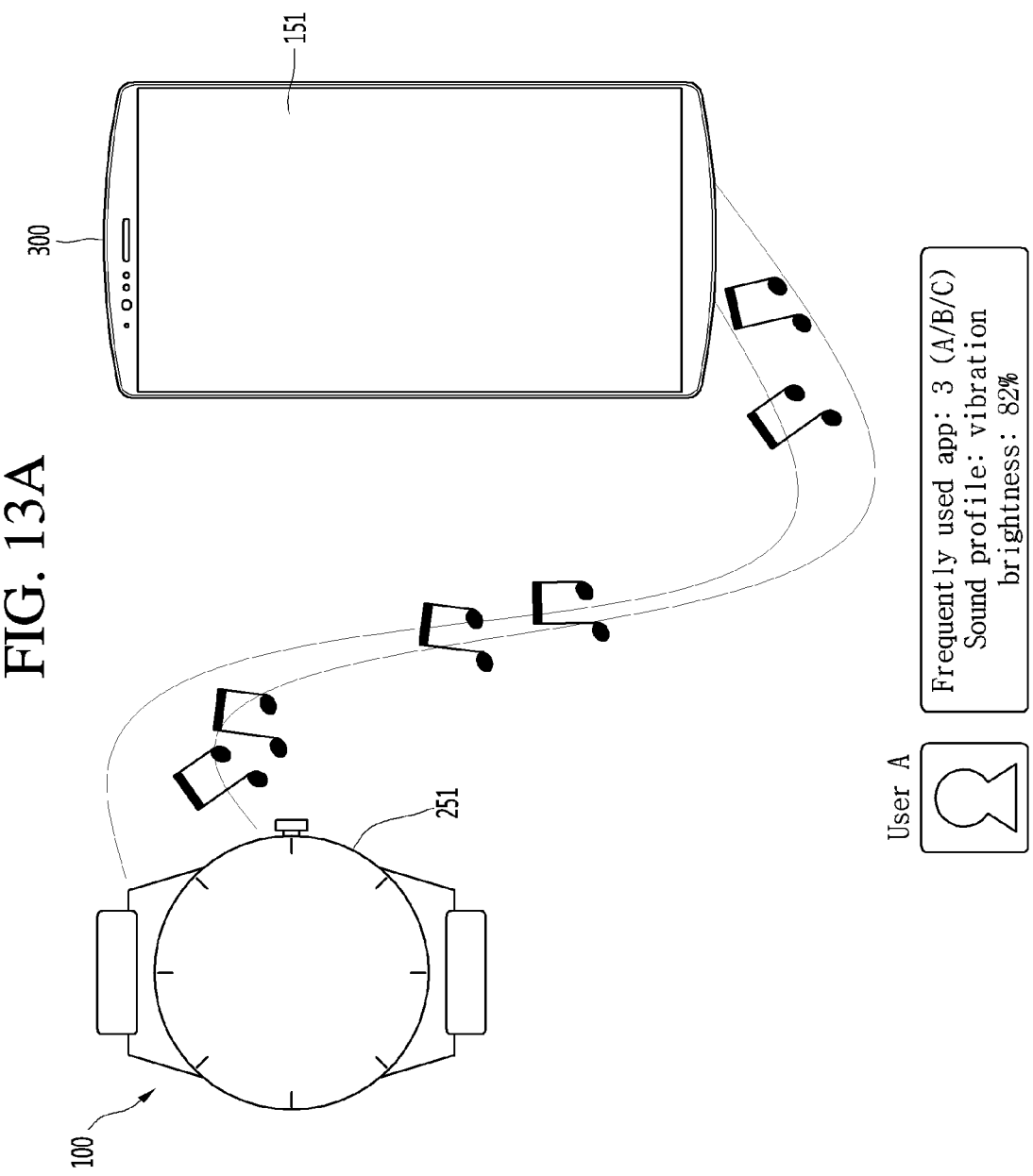

FIGS. 13A and 13B are diagrams illustrating an example in which each of the watch-type mobile terminal and the mobile terminal enters a specific user mode according to a connection pattern between the watch-type mobile terminal and the mobile terminal.

Referring to FIG. 13A, the watch-type mobile terminal 100 and the mobile terminal 300 may be connected to each other through a sound pattern. As the watch-type mobile terminal 100 and the mobile terminal 300 are connected to each other through the sound pattern, an operation mode of each of the watch-type mobile terminal 100 and the mobile terminal 300 may be converted into a specific user mode. For example, when the watch-type mobile terminal 100 and the mobile terminal 300 are connected to each other through the sound pattern, the operation mode of each of the watch-type mobile terminal 100 and the mobile terminal 300 may be converted into a first user mode corresponding to a user A. In the first user mode, the watch-type mobile terminal 100 and the mobile terminal 300 may display application icons corresponding to applications A, B, and C frequently used by the user A, on a home screen, a sound may be set to a vibration, and a screen may be set so as to have the brightness of about 82%.

Next, referring to FIG. 13B, the watch-type mobile terminal 100 and the mobile terminal 300 may be connected to each other through a vibration pattern. As the watch-type mobile terminal 100 and the mobile terminal 300 are connected to each other through the vibration pattern, the operation mode of each of the watch-type mobile terminal 100 and the mobile terminal 300 may be converted into a specific user mode. For example, when the watch-type mobile terminal 100 and the mobile terminal 300 are connected to each other through the vibration pattern, the operation mode of each of the watch-type mobile terminal 100 and the mobile terminal 300 may be converted into a second user mode corresponding to a user B. In the second user mode, the watch-type mobile terminal 100 and the mobile terminal 300 may display application icons corresponding to applications D and E frequently used by the user B, on a home screen, a sound may be set to a melody, and a screen may be set so as to have the brightness of about 100%.

FIG. 3 will be described again.

The control unit 180 confirms whether a charge amount of the watch-type mobile terminal 100 is equal to or less than a preset charge amount (S119), and when the charge amount is equal to or less than the preset charge amount, the control unit 180 transmits an unpairing request to the mobile terminal 300 (S121).

The watch-type mobile terminal 100 and the mobile terminal 300 are unpaired from each other according to the unpairing request (S123).

In an embodiment, the control unit 180 may unpair the watch-type mobile terminal 100 from the mobile terminal 300 based on a charged state of the watch-type mobile terminal 100 or may periodically transmit a pairing request.

Operations S121 and S123 will be described with reference to the following drawings.

Figure 14A:
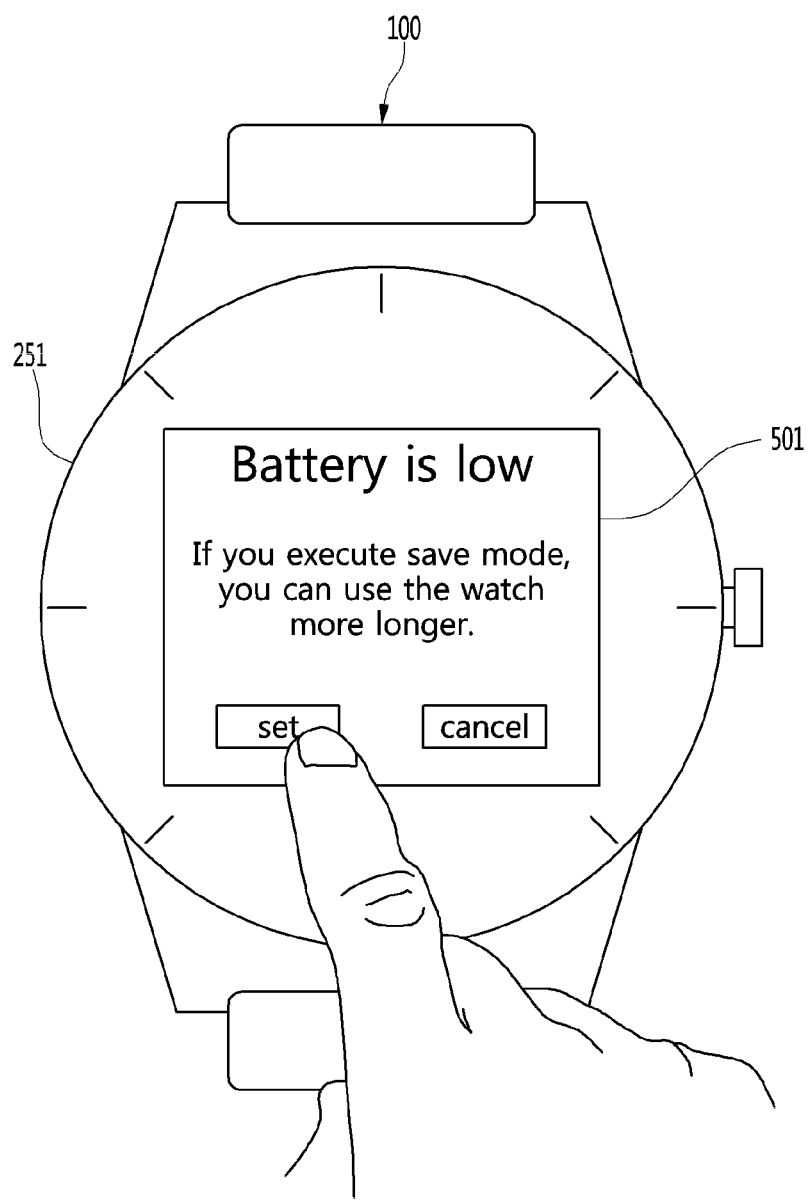
FIGS. 14A and 14B are diagrams illustrating an example in which a watch-type mobile terminal is unpaired from a mobile terminal based on a charged state of the watch-type mobile terminal, according to an embodiment of the present invention.
Figure 14B:
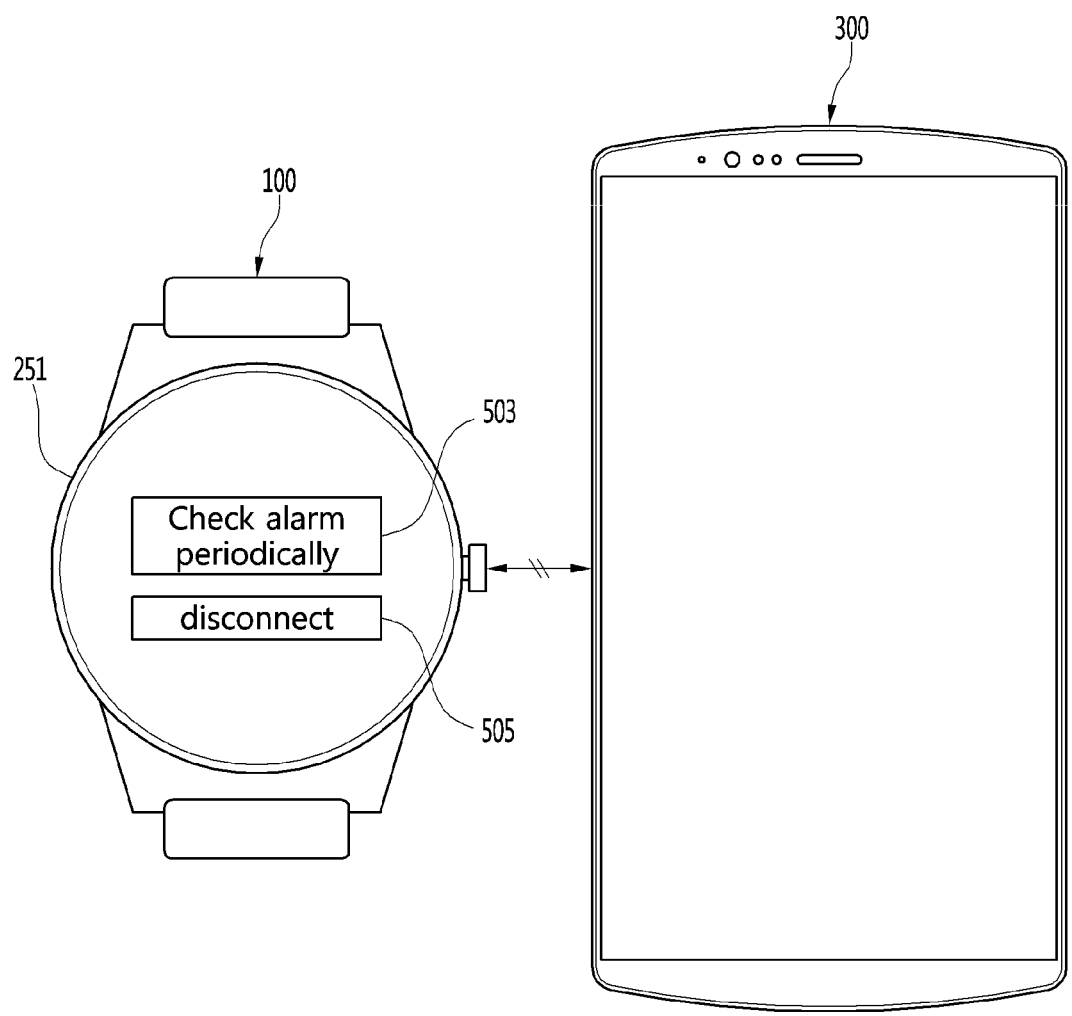

FIGS. 14A and 14B are diagrams illustrating an example in which the watch-type mobile terminal is unpaired from the mobile terminal based on a charged state of the watch-type mobile terminal, according to an embodiment of the present invention.

Referring to FIG. 14A, when the charge amount of the watch-type mobile terminal 100 is less than about 20%, the control unit 180 may provide notification of a lack of a charge amount and may control the display unit 251 to display a message window 501 guiding the watch-type mobile terminal 100 to enter a save mode. The save mode may be a mode for saving power of the watch-type mobile terminal 100 and may be a mode for unpairing from the mobile terminal 300 or periodically pairing with the mobile terminal 300. When touch input requesting for entering the save mode is received, as shown FIG. 14B, the control unit 180 may control the display unit 251 to display an alarm check button 503 for periodically checking an alarm received by the mobile terminal 300 and an unpairing button 505. When the alarm check button 503 is selected, the control unit 180 may be paired with the mobile terminal 300 in preset hours (for example, 20 minutes) and may periodically receive an alarm from the mobile terminal 300. The control unit 180 may be periodically connected to the mobile terminal 300 and control the display unit 251 to display the alarm received from the mobile terminal 300.

When the unpairing button 505 is selected, the control unit 180 may be unpaired from the mobile terminal 300 and may control the display unit 251 to display a watch screen. An indicator may be displayed on the watch screen, the indicator indicating that the control unit 180 is unpaired from the mobile terminal 300.

Meanwhile, when a charger is connected to the watch-type mobile terminal 100, the control unit 180 may automatically release the save mode and may attempt to perform pairing with the mobile terminal 300.

The inventive concept as described earlier may be implemented as a computer readable code in a medium having a program thereon. The computer readable medium includes all kinds of storage devices storing data that may be read by a computer system. Examples of a computer readable medium are a hard disk drive (HDD), a solid state disk (SSD), a silicon disk drive (SDD), a ROM, a RAM, a CD-ROM, a magnetic tape, a floppy disk, and an optical data storage device, and it is also implemented in the form of a carrier wave (e.g., data transmission through the Internet). Also, the computer may also include the control unit 180 of the terminal. Thus, the detailed description should not be construed as limitative in all aspects and should be considered exemplary. The scope of the inventive concept should be defined by the reasonable understanding of the following claims and all changes falling within the equivalent scope of the inventive concept are included in the scope of the inventive concept.

The invention claimed is:

1. A watch-type mobile terminal comprising:
   a short-range communication module configured to perform short-range communication with a mobile terminal around the watch-type mobile terminal;
   an output unit configured to output a sound pattern or a vibration pattern; and
   a control unit configured to control the output unit to output a connection pattern for pairing with the mobile terminal and control the short-range communication module to perform pairing with the mobile terminal based on the output connection pattern,
   wherein the connection pattern is any one of the sound pattern and the vibration pattern,
   wherein the sound pattern or the vibration pattern is a pattern used for requesting the pairing to the mobile terminal,
   wherein a pairing request code for authenticating the pairing is inserted into the sound pattern, and the pairing request code comprises a plurality of unit codes respectively inserted into a plurality of sound signal sections constituting the sound pattern, and
   wherein each of the plurality of unit codes is inserted so as to correspond to an intensity or a length of the respective sound signal section.

2. The watch-type mobile terminal according to claim 1, further comprising a display unit,
   wherein, while the control unit outputs the connection pattern, the control unit controls the display unit to display a process of the pairing.

3. The watch-type mobile terminal according to claim 1, wherein, when the watch-type mobile terminal is paired with the mobile terminal through the sound pattern, the control unit executes a first application corresponding to the sound pattern.

4. The watch-type mobile terminal according to claim 1, wherein, when the watch-type mobile terminal is paired with the mobile terminal through the vibration pattern, the control unit executes a second application corresponding to the vibration pattern.

5. The watch-type mobile terminal according to claim 1, wherein the control unit automatically changes at least one of a sound setting and an alarm setting of the watch-type mobile terminal according to a kind of the connection pattern.

6. The watch-type mobile terminal according to claim 1, wherein the control unit converts an operation mode of the watch-type mobile terminal into a user mode corresponding to a specific user according to a kind of the connection pattern.

7. An operation method of a watch-type mobile terminal, the operation method comprising:
   outputting a connection pattern for pairing with a mobile terminal around the watch-type mobile terminal; and
   performing pairing with the mobile terminal based on the output connection pattern,
   wherein the connection pattern is any one of a sound pattern and a vibration pattern, and
   wherein the sound pattern or the vibration pattern is a pattern used for requesting the pairing to the mobile terminal,
   wherein a pairing request code for authenticating the pairing is inserted into the sound pattern and the pairing request code comprises a plurality of unit codes respectively inserted into a plurality of sound signal sections constituting the sound pattern, and
   wherein each of the plurality of unit codes is inserted so as to correspond to an intensity or a length of the respective sound signal section.

8. The operation method according to claim 7, further comprising displaying a process of the pairing while outputting the connection pattern.

9. The operation method according to claim 7, further comprising executing a first application corresponding to the sound pattern when the watch-type mobile terminal is paired with the mobile terminal through the sound pattern.

10. The operation method according to claim 7, further comprising executing a second application corresponding to the vibration pattern when the watch-type mobile terminal is paired with the mobile terminal through the vibration pattern.

11. The operation method according to claim 7, further comprising automatically changing at least one of sound setting and alarm setting of the watch-type mobile terminal according to a kind of the connection pattern.

12. The operation method according to claim 7, further converting an operation mode of the watch-type mobile terminal into a user mode corresponding to a specific user according to a kind of the connection pattern.

13. A mobile terminal comprising:
   a short-range communication module configured to perform short-range communication with a watch-type mobile terminal around the mobile terminal;
   an input unit configured to acquire a sound pattern or a vibration pattern output from the watch-type mobile terminal; and
   a control unit configured to control the short-range communication module to perform pairing with the watch-type mobile terminal when the sound pattern or the vibration pattern acquired by the input unit is a preset pattern,
   wherein the sound pattern or the vibration pattern is a pattern used for determining the pairing with the watch-type mobile terminal,
   wherein a pairing request code for authenticating the pairing is inserted into the sound pattern, the pairing request code comprises a plurality of unit codes respectively inserted into a plurality of sound signal sections constituting the sound pattern, and
   wherein each of the plurality of unit codes is inserted so as to correspond to an intensity or a length of the respective sound signal section.

14. The mobile terminal according to claim 13, wherein, when the pairing request code for authenticating the pairing, inserted into the sound pattern, is a preset code, the control unit controls the short-range communication module to perform pairing with the watch-type mobile terminal.

15. The mobile terminal according to claim 13, further comprising a display unit,
   wherein, while the control unit acquires the connection pattern, the control unit controls the display unit to display a process of the pairing.

16. The mobile terminal according to claim 13, wherein, when the mobile terminal is paired with the watch-type mobile terminal, the control unit executes an application corresponding to the connection pattern.

* * * * *